United States Patent
Chono et al.

(10) Patent No.: US 10,154,267 B2
(45) Date of Patent: Dec. 11, 2018

(54) VIDEO ENCODING DEVICE, VIDEO DECODING DEVICE, VIDEO ENCODING METHOD, VIDEO DECODING METHOD, AND PROGRAM

(75) Inventors: Keiichi Chono, Tokyo (JP); Yuzo Senda, Tokyo (JP); Junji Tajime, Tokyo (JP); Hirofumi Aoki, Tokyo (JP); Kenta Senzaki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 13/881,467

(22) PCT Filed: Nov. 22, 2011

(86) PCT No.: PCT/JP2011/006509
§ 371 (c)(1),
(2), (4) Date: May 3, 2013

(87) PCT Pub. No.: WO2012/070232
PCT Pub. Date: May 31, 2012

(65) Prior Publication Data
US 2013/0223514 A1    Aug. 29, 2013

(30) Foreign Application Priority Data

Nov. 26, 2010  (JP) .................. 2010-264320
Feb. 9, 2011  (JP) .................. 2011-026331

(51) Int. Cl.
*H04N 7/26* (2006.01)
*H04N 19/156* (2014.01)
(Continued)

(52) U.S. Cl.
CPC ........... *H04N 19/156* (2014.11); *H04N 19/12* (2014.11); *H04N 19/172* (2014.11);
(Continued)

(58) Field of Classification Search
None
See application file for complete search history.

(56) References Cited

U.S. PATENT DOCUMENTS

| 6,119,091 A | 9/2000 | Huang et al. |
| 6,748,113 B1 | 6/2004 | Kondo et al. |

(Continued)

FOREIGN PATENT DOCUMENTS

| CA | 2819014 A1 | 5/2012 |
| CN | 1625902 A | 6/2005 |

(Continued)

OTHER PUBLICATIONS

Gary Sullivan, "Seven Steps Toward a More Robust Codec Design", Joint Video Team (JVT) of ISO/IEC MPEG & ITU-T VCEG (ISO/IEC JTC1/SC29/WG11 and ITU-T SG16 Q.6) $3^{rd}$ Meeting: Fairfax, Virginia, USA, May 6-10, 2002, pp. 1-7.

(Continued)

*Primary Examiner* — Anand S Rao
*Assistant Examiner* — Samuel D Fereja
(74) *Attorney, Agent, or Firm* — Sughrue Mion, PLLC

(57) ABSTRACT

A video encoding device includes: transform means 11 for transforming an image block; entropy encoding means 12 for entropy-encoding transformed data of the image block transformed by the transform means 11; PCM encoding means 13 for PCM-encoding the image block; multiplex data selection means 14 for selecting output data of the entropy encoding means 12 or the PCM encoding means 13, in a block of a block size set from the outside; and multiplexing means 15 for embedding a PCM header in a bitstream, in the block of the set from the outside block size.

3 Claims, 14 Drawing Sheets

| pic_parameter_set_rbsp( ) { | C | Descriptor |
|---|---|---|
| ... | | |
| max_pcm_coding_unit_hierarchy_depth | 0 | ue(v) |
| ... | | |
| } | | |
| } | | |

(51) Int. Cl.
  *H04N 19/503* (2014.01)
  *H04N 19/176* (2014.01)
  *H04N 19/46* (2014.01)
  *H04N 19/61* (2014.01)
  *H04N 19/593* (2014.01)
  *H04N 19/12* (2014.01)
  *H04N 19/172* (2014.01)
  *H04N 19/184* (2014.01)

(52) U.S. Cl.
  CPC ......... *H04N 19/176* (2014.11); *H04N 19/184* (2014.11); *H04N 19/46* (2014.11); *H04N 19/503* (2014.11); *H04N 19/593* (2014.11); *H04N 19/61* (2014.11)

(56) References Cited

U.S. PATENT DOCUMENTS

| | | | |
|---|---|---|---|
| 6,873,625 | B1 | 3/2005 | Yoo et al. |
| 2005/0018774 | A1 | 1/2005 | Winger et al. |
| 2005/0123282 | A1 | 6/2005 | Novotny et al. |
| 2007/0031051 | A1* | 2/2007 | Lee et al. ................ 382/239 |
| 2007/0098081 | A1* | 5/2007 | Vajhallya ............ G06F 17/147 375/240.25 |
| 2009/0067734 | A1* | 3/2009 | Kalevo ................ 382/238 |
| 2009/0097567 | A1 | 4/2009 | Shigeta et al. |
| 2009/0135908 | A1* | 5/2009 | Marpe ............... H04N 19/176 375/240.12 |
| 2009/0177478 | A1* | 7/2009 | Jax et al. ................ 704/500 |
| 2010/0074338 | A1* | 3/2010 | Yamori ............. H04N 19/139 375/240.16 |
| 2010/0177820 | A1* | 7/2010 | Chono ............... H04N 19/196 375/240.03 |
| 2010/0208794 | A1* | 8/2010 | Ohgose et al. ......... 375/240.02 |
| 2010/0220788 | A1* | 9/2010 | Wittmann et al. ........ 375/240.16 |
| 2010/0232507 | A1* | 9/2010 | Cho et al. ............ 375/240.16 |
| 2010/0238998 | A1* | 9/2010 | Nanbu ............... H03M 7/4006 375/240.03 |
| 2010/0254450 | A1* | 10/2010 | Narroschke .......... H04N 19/159 375/240.03 |
| 2011/0038412 | A1* | 2/2011 | Jung ............... H04N 19/146 375/240.12 |
| 2011/0069900 | A1* | 3/2011 | Lee et al. ................ 382/238 |
| 2011/0286520 | A1* | 11/2011 | Xu ................... H04N 19/176 375/240.12 |
| 2011/0292247 | A1* | 12/2011 | Gharavi-Alkhansari et al. ........... 348/231.99 |
| 2011/0310971 | A1 | 12/2011 | Vajhallya et al. |
| 2012/0087411 | A1 | 4/2012 | Haskell |
| 2013/0114731 | A1* | 5/2013 | Lee ............... H04N 19/00775 375/240.18 |
| 2013/0182760 | A1* | 7/2013 | Sasai ............... H04N 19/70 375/240.02 |
| 2013/0195370 | A1* | 8/2013 | Sasai ............... H04N 19/70 382/233 |
| 2013/0272623 | A1* | 10/2013 | Jeon ............... H04N 7/46 382/238 |

FOREIGN PATENT DOCUMENTS

| | | |
|---|---|---|
| CN | 101087408 A | 12/2007 |
| CN | 101091393 A | 12/2007 |
| CN | 101175207 A | 5/2008 |
| CN | 101198051 A | 6/2008 |
| CN | 101340584 A | 1/2009 |
| CN | 101553988 A | 10/2009 |
| CN | 101822061 A | 9/2010 |
| EP | 0293533 A2 | 12/1988 |
| JP | 2004-135251 A | 4/2004 |
| JP | 2009-100125 A | 5/2009 |
| KR | 1020070098428 A | 10/2007 |
| RU | 2355127 C2 | 5/2009 |

OTHER PUBLICATIONS

"Information technology—Coding of audio-visual objects—Part 10: Advanced Video Coding", International Standard ISO/IEC 14496-10, May 15, 2009, pp. 1-674.
"Test Model under Consideration", JCT-VC, JCTVC-B205, Joint Collaborative Team on Video Coding (JCT-VC) of ITU-T SG16 WP3 and ISO/IEC JTC1/SC29/WG11 $2^{nd}$ Meeting: Geneva, CH, Jul. 21-28, 2010, pp. 1-77.
Wei-Jung Chen, et al., "CE5: Improved coding of inter prediction mode with LCEC", Qualcomm Inc., JCTVC-D370, Joint Collaborative Team on Video Coding (JCT-VC) of ITU-T SG16 WP3 and ISO/IEC JTC1/SC29/WG11 $4^{th}$ Meeting: Daegu, KR, Jan. 20-28, 2011, pp. 1-2.
Shan Liu, et al., "Remove Partition Size N×N", JCTVC-D432, Joint Collaborative Team on Video Coding (JCT-VC) of ITU-T SG16 WP3 and ISO/IEC JTC1/SC29/WG11 $4^{th}$ Meeting: Daegu, KR, Jan. 20-28, 2011.
European Office Communication dated May 22, 2015 issued in European application No. 11 843 126.1-1908.
Joint Collaborative Team on Video Coding of ITU-T SG16 WP3 and ISO/IEC JTC1/SC29/WG11, Keiichi Chono et al., "Pulse code modulation mode for HEVC," 96.MPEG Meeting; Mar. 21, 2011; Geneva.
Communication dated Nov. 24, 2015 from the Japanese Patent Office in counterpart application No. 2015-205316.
Hellman et al., "Changing Luma/Chroma Coefficient Interleaving from CU to TU level" Joint Collaborative Team on Video Coding (JCT-VC) of ITU-T SG16 WP3 and ISO/IEC JTC1/SC29/WG11 7th Meeting: Geneva CH, Nov. 21-30, 2011 (10 pages).
Communication dated Feb. 23, 2016 from Japanese Patent Office in counterpart application No. 2015-205316.
Keiichi Chono et al., "Pulse code modulation mode for HVEC", Joint Collaborative Team on Video Coding, Jan. 20-28, 2011, Daegu, Korea, nine (9) pages total.
Communication dated Apr. 25, 2016, from the State Intellectual Property Office of People's Republic of China in counterpart application No. 201310616846.3.
Communication dated Jun. 2, 2016, from the Russian Patent Office in in counterpart application No. 2015117981/08.
Extended European Search Report dated Oct. 7, 2013 issued by the European Patent Office in counterpart European Application No. 13169315.2.
Atul Puri, et al., "Video Coding Using the H.264/MPEG-4 AVC Compression Standard", Signal Processing: Image Communication, Elsevier Science Publishers, Amsterdam, vol. 19, No. 9, 2004, pp. 793-849.
Thomas Wiegand, et al., "Overview of the H.264/AVC Video Coding Standard", IEEE Transactions on Circuits and Systems for Video Technology, IEEE Service Center, Piscataway, New Jersey, USA, vol. 13, No. 7, Jul. 2003, pp. 560-576.
Communication dated Jul. 25, 2017, from the Mexican Patent Office in counterpart application No. MX/a/2016/004819.
Communication dated Mar. 29, 2018, from the State Intellectual Property Office of People's Republic of China in counterpart Application No. 201610391358.0.
Communication dated Feb. 14, 2018, from the State Intellectual Property Office of People's Republic of China in counterpart Application No. 201610006164.4.
Communication dated Feb. 2, 2018 from the State Intellectual Property Office of the P.R.C. in counterpart Chinese application No. 201610005941.3.

* cited by examiner

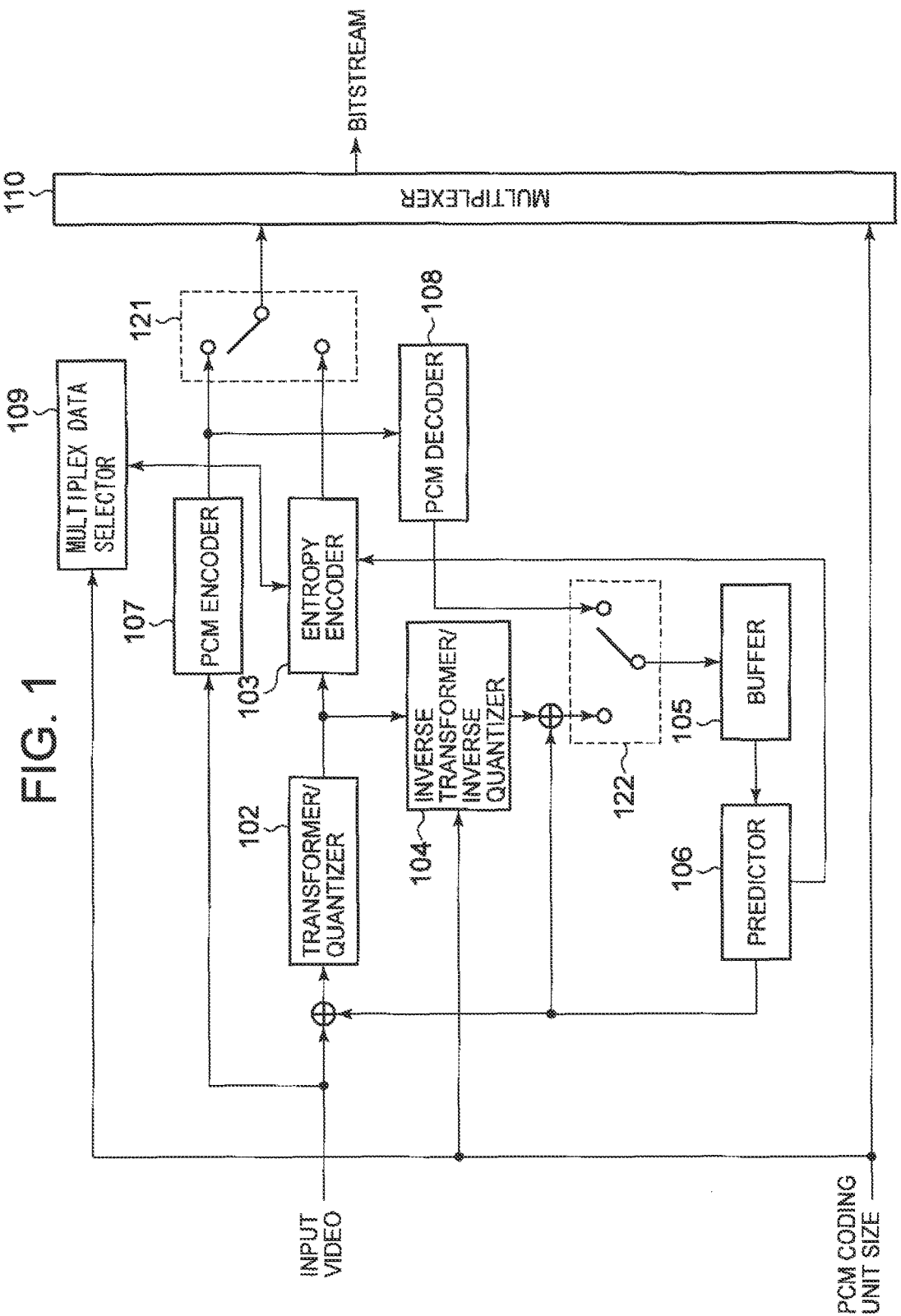

FIG. 2

| prediction_unit(x0,y0, currPredUnitSize) { | C | Descriptor |
|---|---|---|
|   if( slice_type !=I) | | |
|     skip_flag | | |
|   if( skip_flag){ | | |
|     ... | | |
|   } | | |
|   else { | | |
|     if( !entropy_coding_mode_flag) | | |
|       mode_table_idx | | vlc(n,v) |
|     else { | | |
|       if( slice_type !=I) | | |
|         pred_mode | 2 | u(1) \| ae(v) |
|     } | | |
|     if( PredMode==MODE_INTRA) { | | |
|       if( currPredUnitSize>=pcmCodingUnitSize) | | |
|         pcm_flag | 2 | u(1) \| ae(v) |
|       if( pcm_unit_flag) { | | |
|         pcm_alignment_zero_bit | 2 | u(v) |
|       } else { | | |
|         ... | | |
|       } | | |
|     } | | |
|     else if( PredMode==MODE_INTER) { | | |
|       ... | | |
|     } | | |
|     else if( PredMode==MODE_DIRECT) { | | |
|       ... | | |
|     } | | |
|   } | | |
| } | | |

FIG. 3

| seq_parameter_set_data( ) { | C | Descriptor |
|---|---|---|
|   ... | | |
|   log2_min_coding_unit_size_minus3 | 0 | ue(v) |
|   max_coding_unit_hierarchy_depth | 0 | ue(v) |
|   ... | | |
|   max_pcm_coding_unit_hierarchy_depth | 0 | ue(v) |
|   ... | | |
|   } | | |
| } | | |

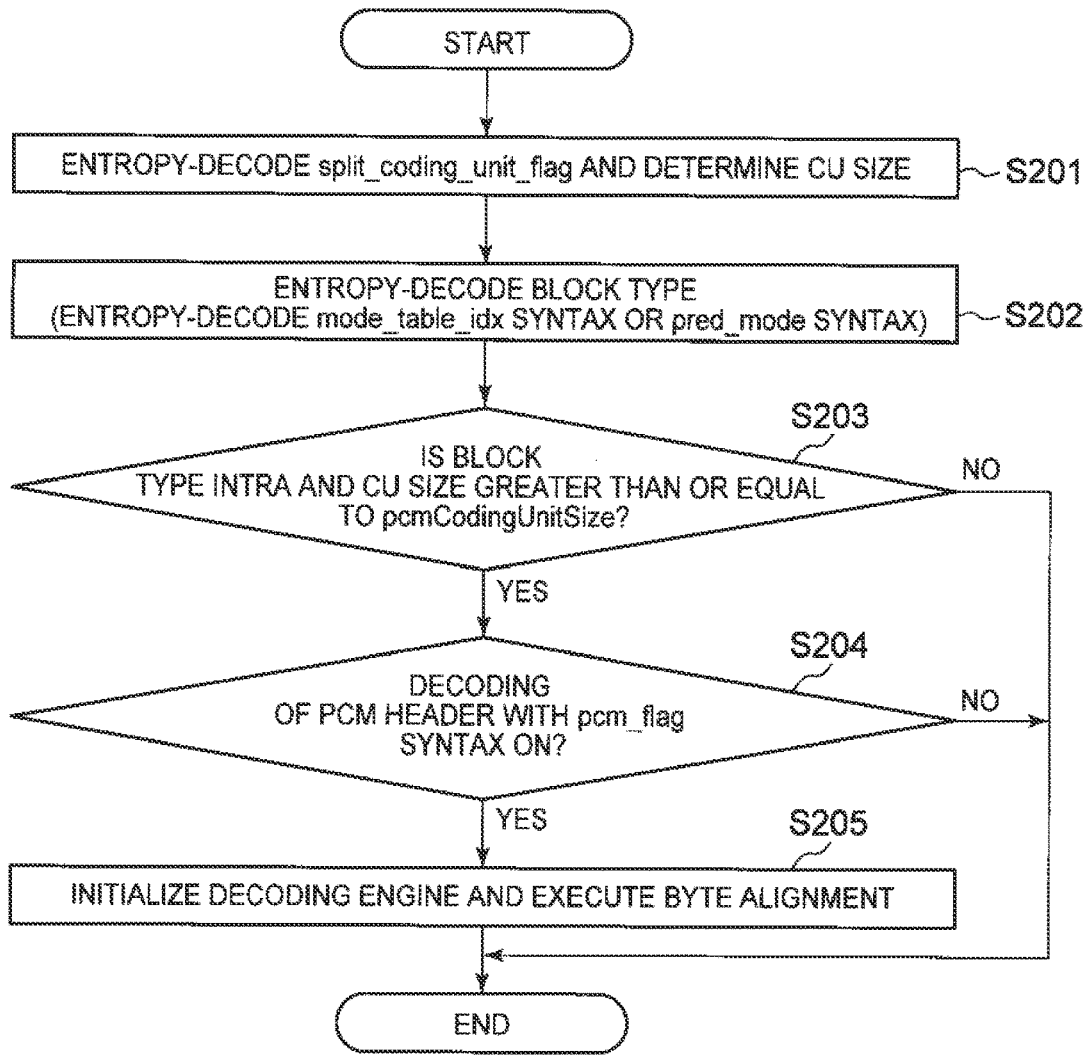

FIG. 8

| slice_header( ) { | C | Descriptor |
|---|---|---|
| ... | | |
|    max_pcm_coding_unit_hierarchy_depth | 0 | ue(v) |
| ... | | |
| } | | |

FIG. 9

| prediction_unit(x0,y0, currPredUnitSize) { | C | Descriptor |
|---|---|---|
|   if( slice_type !=I) | | |
|     skip_flag | | |
|   if( skip_flag){ | | |
|     ... | | |
|   } | | |
|   else { | | |
|     if( !entropy_coding_mode_flag) | | |
|       mode_table_idx | | vlc(n,v) |
|     else { | | |
|       if( slice_type !=I) | | |
|         pred_mode | 2 | u(1) \| ae(v) |
|     } | | |
|     if( PredMode==MODE_INTRA) { | | |
|       if( currPredUnitSize<=pcmCodingUnitSize) | | |
|         pcm_flag | 2 | u(1) \| ae(v) |
|       if( pcm_unit_flag) { | | |
|         pcm_alignment_zero_bit | 2 | u(v) |
|       } else { | | |
|         ... | | |
|       } | | |
|     } | | |
|     else if( PredMode==MODE_INTER) { | | |
|       ... | | |
|     } | | |
|     else if( PredMode==MODE_DIRECT) { | | |
|       ... | | |
|     } | | |
|   } | | |
| } | | |

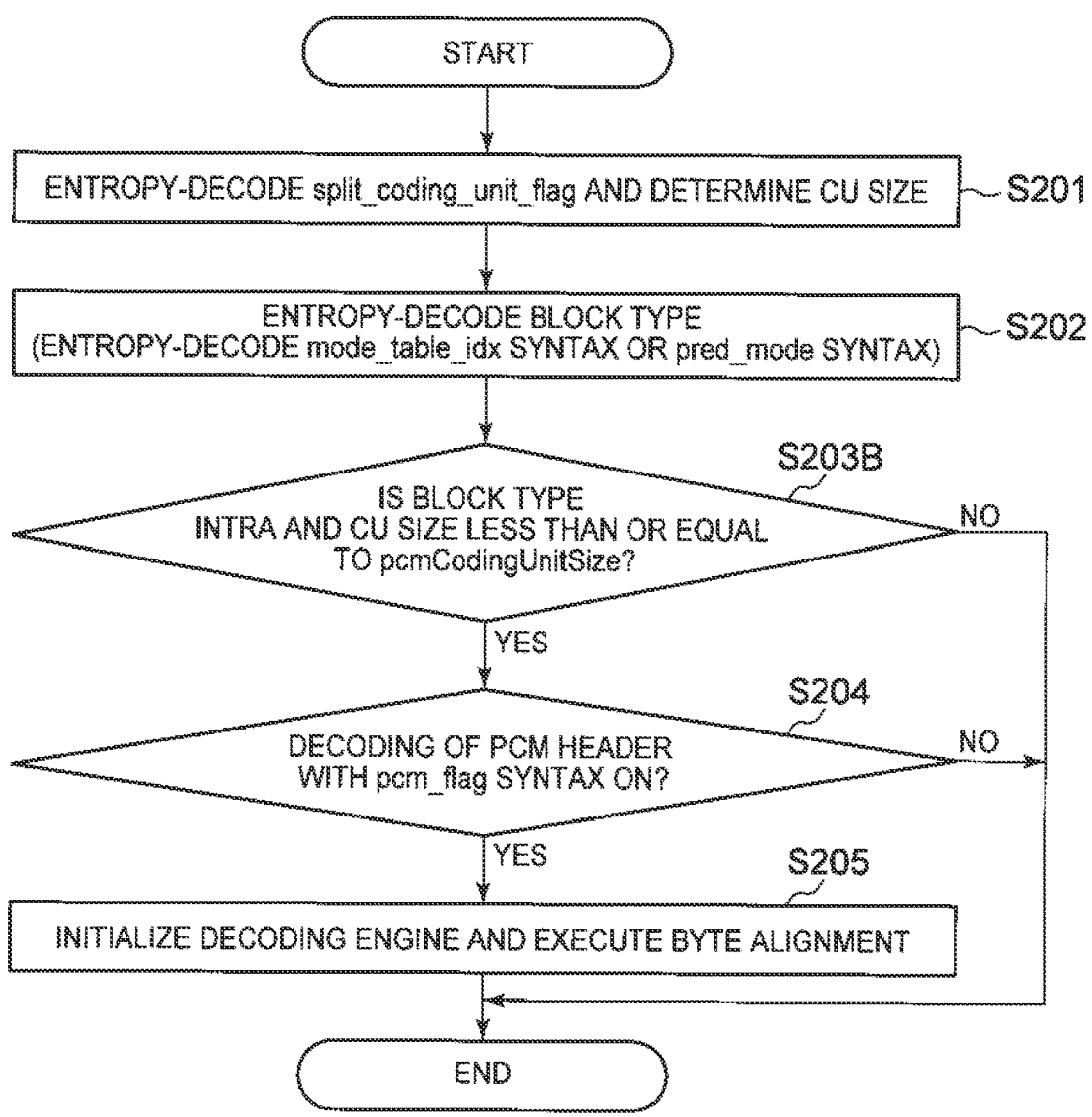

VIDEO ENCODING DEVICE, VIDEO DECODING DEVICE, VIDEO ENCODING METHOD, VIDEO DECODING METHOD, AND PROGRAM

CROSS REFERENCE TO RELATED APPLICATIONS

This application is a National Stage of International Application No. PCT/JP2011/006509 filed Nov. 22, 2011, claiming priority based on Japanese Patent Application Nos. 2010-264320 filed Nov. 26, 2010 and 2011-026331 filed Feb. 9, 2011, the contents of all of which are incorporated herein by reference in their entirety.

TECHNICAL FIELD

The present invention relates to a video encoding device and a video decoding device that use PCM encoding.

BACKGROUND ART

Patent Literature (PTL) 1 proposes a video encoding method for embedding, in an output bitstream, information indicating a block type that is not subjected to a transform process and an entropy encoding process, in order to guarantee a certain processing time for a video encoding device or a video decoding device.

An example of the block type that is not subjected to the transform process and the entropy encoding process is pulse code modulation (PCM) described in Non Patent Literature (NPL) 1. The term block type means an encoding type (below-mentioned intra prediction, inter prediction, and PCM) used for a block.

A video encoding device described in NPL 1 has a structure shown in FIG. 14. The video encoding device shown in FIG. 14 is hereafter referred to as a typical video encoding device.

A structure and an operation of the typical video encoding device that receives each frame of digitized video as input and outputs a bitstream are described below, with reference to FIG. 14.

The video encoding device shown in FIG. 14 includes a transformer/quantizer 102, an entropy encoder 103, an inverse transformer/inverse quantizer 104, a buffer 105, a predictor 106, a PCM encoder 107, a PCM decoder 108, a multiplex data selector 109, a multiplexer 110, a switch 121, and a switch 122.

The video encoding device shown in FIG. 14 divides each frame into blocks of 16×16 pixel size called macroblocks (MBs), and encodes each MB sequentially from top left of the frame. In AVC described in NPL 1, each MB is further divided into blocks of 4×4 pixel size, and each block of 4×4 pixel size is encoded.

FIG. 15 is an explanatory diagram showing an example of block division in the case where the frame has a spatial resolution of QCIF (Quarter Common Intermediate Format). The following describes an operation of each unit while focusing only on pixel values of luminance, for simplicity's sake.

A prediction signal supplied from the predictor 106 is subtracted from the block-divided input video, and the result is input to the transformer/quantizer 102. There are two types of prediction signal, namely, an intra prediction signal and an inter-frame prediction signal. Each of the prediction signals is described below.

The intra prediction signal is a prediction signal generated based on an image of a reconstructed picture that has the same display time as a current picture and is stored in the buffer 105. Referring to 8.3.1 Intra_4×4 prediction process for luma samples, 8.3.2 Intra_8×8 prediction process for luma samples, and 8.3.3 Intra_16×16 prediction process for luma samples in NPL 1, intra prediction of three block sizes, i.e. Intra_4×4, Intra_8×8, and Intra_16×16, are available.

Intra_4×4 and Intra_8×8 are respectively intra prediction of 4×4 block size and 8×8 block size, as can be understood from (a) and (c) in FIG. 16. Each circle (o) in the drawing represents a reference pixel used for intra prediction, i.e. a pixel of the reconstructed picture having the same display time as the current picture.

In intra prediction of Intra_4×4, reconstructed peripheral pixels are directly set as reference pixels, and used for padding (extrapolation) in nine directions shown in (b) in FIG. 16 to form the prediction signal. In intra prediction of Intra_8×8, pixels obtained by smoothing peripheral pixels of the image of the reconstructed picture by low-pass filters (1/2, 1/4, 1/2) shown under the right arrow in (c) in FIG. 16 are set as reference signals, and used for extrapolation in the nine directions shown in (b) in FIG. 16 to form the prediction signal.

Similarly, Intra_16×16 is intra prediction of 16×16 block size, as can be understood from (a) in FIG. 17. Each circle (o) in the drawing represents a reference pixel used for intra prediction, i.e. a pixel of the reconstructed picture having the same display time as the current picture, as in FIG. 16. In intra prediction of Intra_16×16, peripheral pixels of the reconstructed image are directly set as reference pixels, and used for extrapolation in four directions shown in (b) in FIG. 17 to form the prediction signal.

Hereafter, an MB and a block encoded using the intra prediction signal are respectively referred to as an intra MB and an intra block, a block size of intra prediction is referred to as an intra prediction block size, and a direction of extrapolation is referred to as an intra prediction direction. The intra prediction block size and the intra prediction direction are prediction parameters related to intra prediction.

The inter-frame prediction signal is a prediction signal generated from an image of a reconstructed picture that has a different display time from the one the current picture has and is stored in the buffer 105. Hereafter, an MB and a block encoded using the inter-frame prediction signal are respectively referred to as an inter MB and an inter block. A block size of inter prediction (inter prediction block size) can be selected from, for example, 16×16, 16×8, 8×16, 8×8, 8×4, 4×8, and 4×4.

FIG. 18 is an explanatory diagram showing an example of inter-frame prediction using 16×16 block size. A motion vector $MV=(mv_x, mv_y)$ shown in FIG. 18 is a prediction parameter of inter-frame prediction, which indicates the amount of parallel translation of an inter-frame prediction block (inter-frame prediction signal) of a reference picture relative to a block to be encoded. In AVC, prediction parameters of inter-frame prediction include not only an inter-frame prediction direction representing a direction of the reference picture of the inter-frame prediction signal relative to a picture to be encoded of the block to be encoded, but also a reference picture index for identifying the reference picture used for inter-frame prediction of the block to be encoded. This is because, in AVC, a plurality of reference pictures stored in the buffer 105 can be used for inter-frame prediction.

Inter-frame prediction is described in more detail in 8.4 Inter prediction process in NPL 1.

A picture encoded including only intra MBs is called an I picture. A picture encoded including not only intra MBs but also inter MBs is called a P picture. A picture encoded including inter MBs that use not only one reference picture but two reference pictures simultaneously for inter-frame prediction is called a B picture. In the B picture, inter-frame prediction in which the direction of the reference picture of the inter-frame prediction signal relative to the picture to be encoded of the block to be encoded is to the past is called forward prediction, inter-frame prediction in which the direction of the reference picture of the inter-frame prediction signal relative to the picture to be encoded of the block to be encoded is to the future is called backward prediction, and inter-frame prediction involving both the past and the future is called bidirectional prediction. The direction of inter-frame prediction (inter prediction direction) is a prediction parameter of inter-frame prediction.

The transformer/quantizer 102 frequency-transforms the image (prediction error image) from which the prediction signal has been subtracted.

The transformer/quantizer 102 further quantizes the frequency-transformed prediction error image (frequency transform coefficient), with a predetermined quantization step width Qs. Hereafter, the quantized frequency transform coefficient is referred to as a transform quantization value.

The entropy encoder 103 entropy-encodes the prediction parameters and the transform quantization value. The prediction parameters are information related to MB and block prediction, such as block type (intra prediction, inter prediction, and PCM), intra prediction block size, intra prediction direction, inter prediction block size, and motion vector mentioned above.

The inverse transformer/inverse quantizer 104 inverse-quantizes the transform quantization value, with the quantization step width Qs. The inverse transformer/inverse quantizer 104 further inverse-frequency-transforms the frequency transform coefficient obtained by the inverse quantization. The prediction signal is added to the reconstructed prediction error image obtained by the inverse frequency transform, and the result is supplied to the switch 122.

The multiplex data selector 109 monitors the amount of input data of the entropy encoder 103 corresponding to the MB to be encoded. In the case where the entropy encoder 103 is capable of entropy-encoding the input data within a processing time of the MB, the multiplex data selector 109 selects the output data of the entropy encoder 103, and causes the selected data to be supplied to the multiplexer 110 via the switch 121. The multiplex data selector 109 further selects the output data of the inverse transformer/inverse quantizer 104, and causes the selected data to be supplied to the buffer 105 via the switch 122.

In the case where the entropy encoder 103 is not capable of entropy-encoding the input data within the processing time of the MB, the multiplex data selector 109 selects the output data of the PCM encoder 107 obtained by PCM encoding the video of the MB, and causes the selected data to be supplied to the multiplexer 110 via the switch 121. The multiplex data selector 109 further selects the output data of the PCM decoder 108 obtained by PCM decoding the output data of the PCM encoder 107, and causes the selected data to be supplied to the buffer 105 via the switch 122.

The buffer 105 stores the reconstructed image supplied via the switch 122. The reconstructed image per frame is referred to as a reconstructed picture.

The multiplexer 110 multiplexes the output data of the entropy encoder 103 and the PCM encoder 107, and outputs the multiplexing result.

Based on the operation described above, the multiplexer 110 in the video encoding device generates the bitstream.

CITATION LIST

Patent Literature

PTL 1: Japanese Patent Application Laid-Open No. 2004-135251

Non Patent Literatures

NPL 1: ISO/IEC 14496-10 Advanced Video Coding
NPL 2: "Test Model under Consideration", Document: JCTVC-B205, Joint Collaborative Team on Video Coding (JCT-VC) of ITU-T SG16 WP3 and ISO/IEC JTC1/SC29/WG11 2nd Meeting: Geneva, CH, 21-28 Jul. 2010
NPL 3: W.-J. Chen, X. Wang, and M. Karczewicz, "CE5 Improved coding of inter prediction mode with LCEC," JCTVC-D370
NPL 4: S. Liu, Y.-W. Huang, S. Lei, "Remove Partition Size N×N," JCTVC-D432

SUMMARY OF INVENTION

Technical Problem

The typical technique described above guarantees a certain processing time for a video encoding device or a video decoding device by using, in MBs, PCM that does not involve a transform process and an entropy encoding process.

However, the typical technique described above is based on video encoding that uses MBs of a fixed coding unit size (CU size). Accordingly, as described in NPL 2, when the typical technique described above is applied to video encoding (hereafter referred to as Test Model under Consideration scheme (TMuC scheme)) that uses coding units (coding tree blocks (CTBs)) of a quadtree structure shown in FIG. 19 where the CU size is variable and information (PCM header) indicating PCM is embedded in the output bitstream in CTBs of all layers (i.e. all depths), there is a problem that the ratio of the number of bits of the PCM header included in the bitstream increases and so the quality of compressed video decreases.

Here, a maximum CTB is referred to as a largest coding tree block (LCTB), and a minimum CTB is referred to as a smallest coding tree block (SCTB). In this Description, a block corresponding to the CTB is referred to as a coding unit (CU). Moreover, a concept of a prediction unit (PU) (see FIG. 20) as a unit of prediction for the CU is introduced in the TMuC scheme. FIG. 20 is an explanatory diagram for describing the PU, where only the squares from among the shapes shown in FIG. 20 are supported as the intra prediction block size.

NPL 3 describes improvements in signaling of inter prediction. NPL 4 describes improvements in signaling of inter prediction and intra prediction.

To solve the problem of the typical technique described above, the point that PCM may be selected in a higher-layer CU in order to guarantee a certain processing time for a video encoding device or a video decoding device is taken into consideration. The higher-layer CU is a CU of a smaller depth value, as can be seen from FIG. 19. The number of higher-layer CUs per frame is smaller because their block size is larger. Since the number of higher-layer CUs is smaller, the ratio of the number of bits of the PCM header included in the bitstream can be reduced.

In the present invention, the problem is solved by limiting the depth of the CU for which the PCM header is transmitted, in video encoding based on PCM encoding. That is, in the present invention, the CU size for which the PCM header is transmitted is limited to a predetermined size.

Solution to Problem

A video encoding device according to the present invention includes: transform means for transforming an image block; entropy encoding means for entropy-encoding transformed data of the image block transformed by the transform means; PCM encoding means for encoding by PCM encoding the image block; multiplex data selection means for selecting output data of the entropy encoding means or the PCM encoding means, in a block of a block size set from the outside; and multiplexing means for embedding a PCM header in a bitstream, in the block of the block size set from the outside.

A video decoding device according to the present invention includes: de-multiplexing means for de-multiplexing a bitstream including PCM block size information; PCM block size determination means for determining a PCM block size for which a PCM header is parsed based on the PCM block size information de-multiplexed by the de-multiplexing means; PCM header parsing means for parsing from the bitstream the PCM header, in a block of the PCM block size determined by the PCM block size determination means; entropy decoding means for entropy-decoding transformed data of an image included in the bitstream; inverse transform means for inverse-transforming the transformed data entropy-decoded by the entropy decoding means; PCM decoding means for decoding by PCM decoding PCM data of the image in the bitstream; and decoding control means for controlling the entropy decoding means and the PCM decoding means based on the PCM header parsed by the PCM header parsing means.

A video encoding method according to the present invention includes: selecting data obtained by entropy-encoding transformed data of an image block or data obtained by PCM encoding the image block, in a unit of a block size set from the outside; and embedding a PCM header in a bitstream, in a block of the block size set from the outside.

A video decoding method according to the present invention includes: de-multiplexing a bitstream including PCM block size information; determining a PCM block size for parsing a PCM header based on the de-multiplexed PCM block size information; parsing from the bitstream the PCM header, in a block of the determined PCM block size; controlling an entropy decoding process and a PCM decoding process based on the PCM header: entropy-decoding transformed data of an image in the bitstream and inverse-transforming the entropy-decoded transformed data upon the entropy decoding process being controlled; and decoding by PCM decoding PCM data of the image in the bitstream upon the PCM decoding process being controlled.

A video encoding program according to the present invention causes a computer to execute: a selection process of selecting data obtained by entropy-encoding transformed data of an image block or data obtained by PCM encoding the image block, in a unit of a block size set from the outside; and a multiplexing process of embedding a PCM header in a bitstream, in a block of the block size set from the outside.

A video decoding program according to the present invention causes a computer to execute: a de-multiplexing process of de-multiplexing a bitstream including PCM block size information; a PCM block size determination process of determining a PCM block size for parsing a PCM header based on the de-multiplexed PCM block size information; a PCM header parsing process of parsing from the bitstream the PCM header, in a block of the determined PCM block size; and a process of controlling an entropy decoding process and a PCM decoding process based on the parsed PCM header: wherein the computer is caused to execute a process of entropy-decoding transformed data of an image in the bitstream and inverse-transforming the entropy-decoded transformed data upon the entropy decoding process being controlled, and wherein the computer is caused to execute a process of decoding by PCM decoding PCM data of the image in the bitstream upon the PCM decoding process being controlled.

Advantageous Effects of Invention

According to the present invention, the coding unit size for which the PCM header is signaled is limited to the predetermined size, so that the ratio of the number of bits of the PCM header in the bitstream can be kept low and the quality of compressed video can be maintained, while guaranteeing a certain processing time for the video encoding device.

Moreover, according to the present invention, the interoperability of the video encoding device and the video decoding device can be enhanced by embedding, in the bitstream, the PCM coding unit size information for signaling the predetermined size to the video decoding device.

BRIEF DESCRIPTION OF DRAWINGS

FIG. 1 is a block diagram of a video encoding device in Exemplary Embodiment 1.

FIG. 2 is an explanatory diagram of list 1 indicating a PCM header in PU syntax.

FIG. 3 is an explanatory diagram of list 2 indicating PCM coding unit size information in a sequence parameter set.

FIG. 6 is a flowchart showing a PCM header parsing operation.

FIG. 7 is an explanatory diagram of list 3 indicating PCM coding unit size information in a picture parameter set.

FIG. 8 is an explanatory diagram of list 4 indicating PCM coding unit size information in a slice header.

FIG. 9 is an explanatory diagram of list 1 indicating a PCM header in PU syntax in Exemplary Embodiment 3.

FIG. 10 is a flowchart showing a PCM header parsing operation in Exemplary Embodiment 3.

DESCRIPTION OF EMBODIMENT(S)

Exemplary Embodiment 1

Exemplary Embodiment 1 shows a video encoding device including: means for selecting output data of entropy encoding means or PCM encoding means in a CU size set from the outside; means for embedding, in a bitstream, a PCM header in the CU size set from the outside; and means for embedding, in the bitstream, information related to a PCM coding unit size for signaling the CU size set from the outside to a video decoding device.

To provide description using specific examples, in this exemplary embodiment it is assumed that the CU size for which the PCM header is embedded in the bitstream is greater than or equal to a PCM coding unit size set from the outside (pcmCodingUnitSize). It is also assumed that available coding unit sizes are 128, 64, 32, 16, and 8, and pcmCodingUnitSize is 16. It is further assumed that the information related to the PCM coding unit size is base-2 log (logarithm) of a value obtained by dividing the PCM coding unit size by the minimum coding unit size, as described later. Hence, in this exemplary embodiment, block sizes corresponding to CU sizes for which the PCM header is embedded in the bitstream are 128×128, 64×64, 32×32, and 16×16. Moreover, a specific value of the CU size-related information embedded in the bitstream is 1 (=$\log_2(16/8)$).

Figure 14:
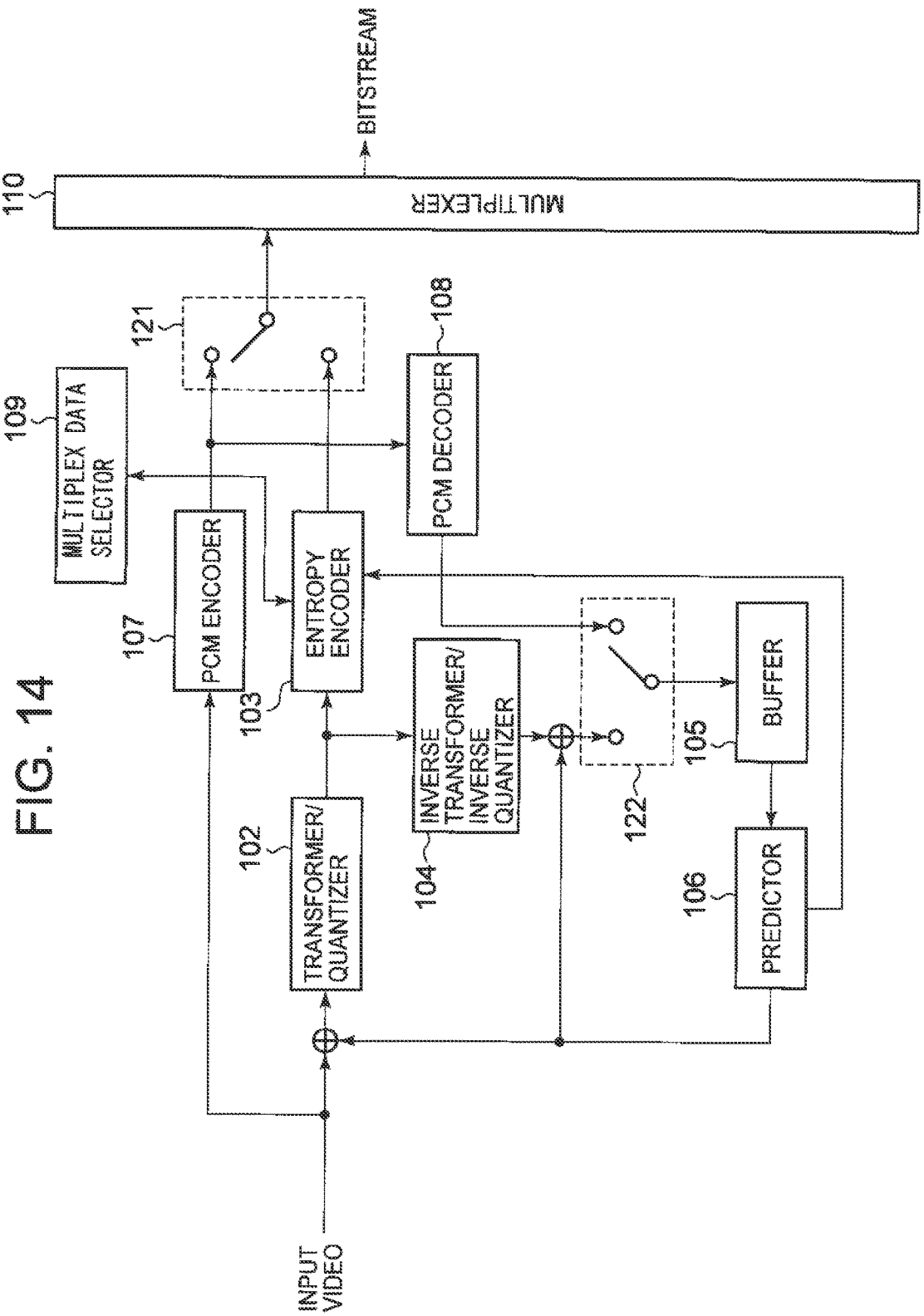
FIG. 14 is a block diagram of a typical video encoding device.
Figure 15:
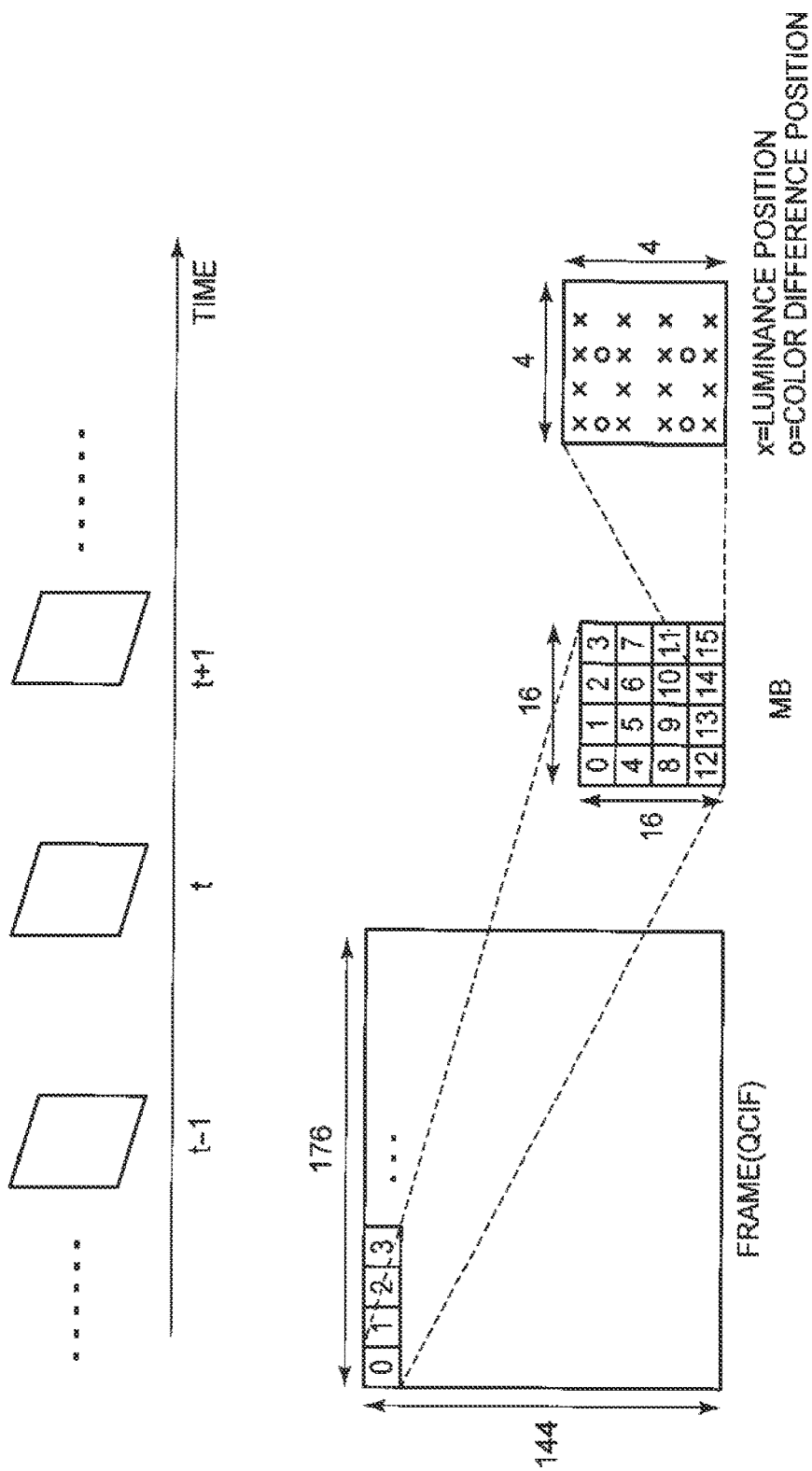
FIG. 15 is an explanatory diagram showing an example of block division.
Figure 16:
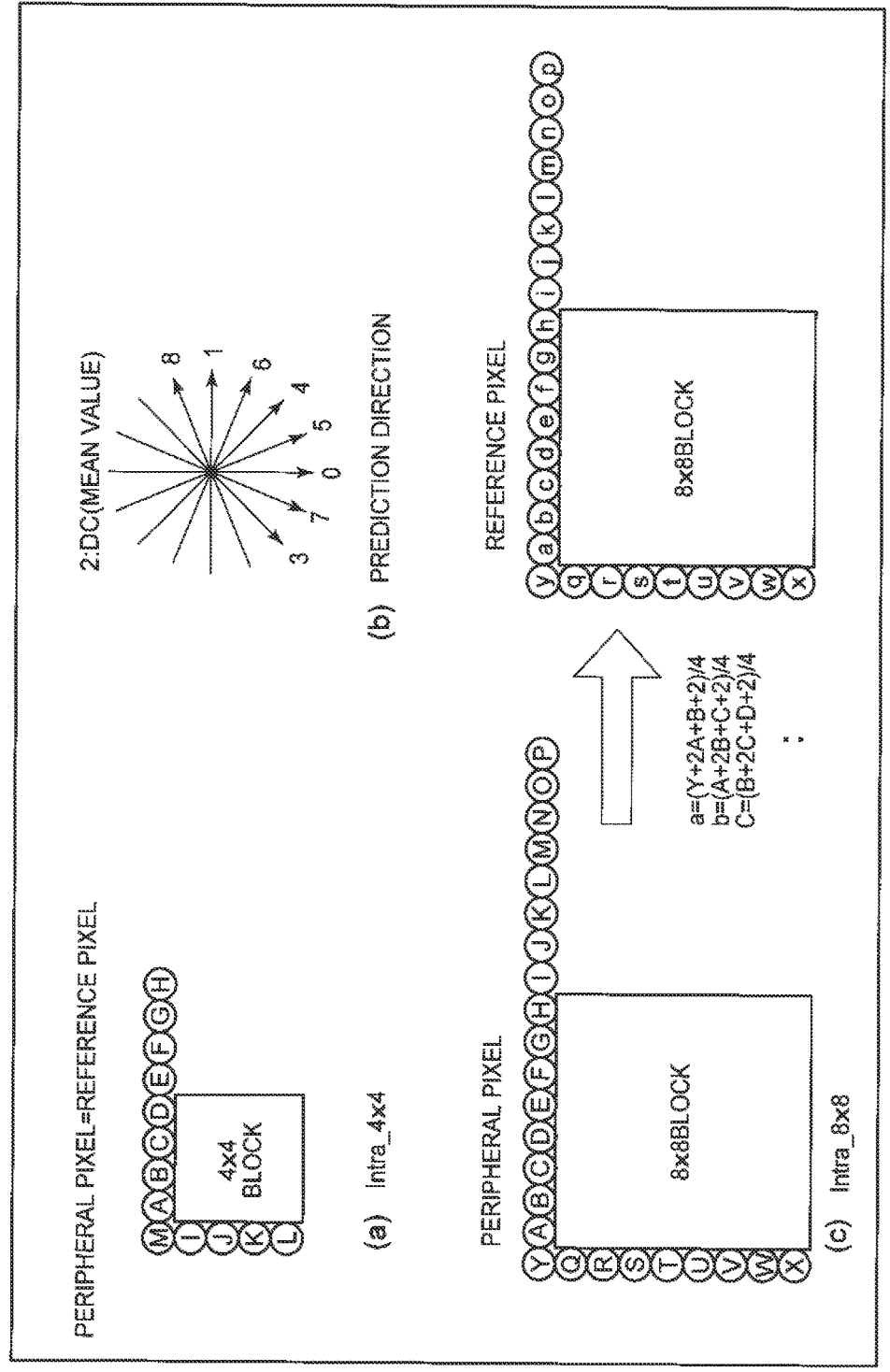
FIG. 16 is an explanatory diagram for describing prediction types.
Figure 17:
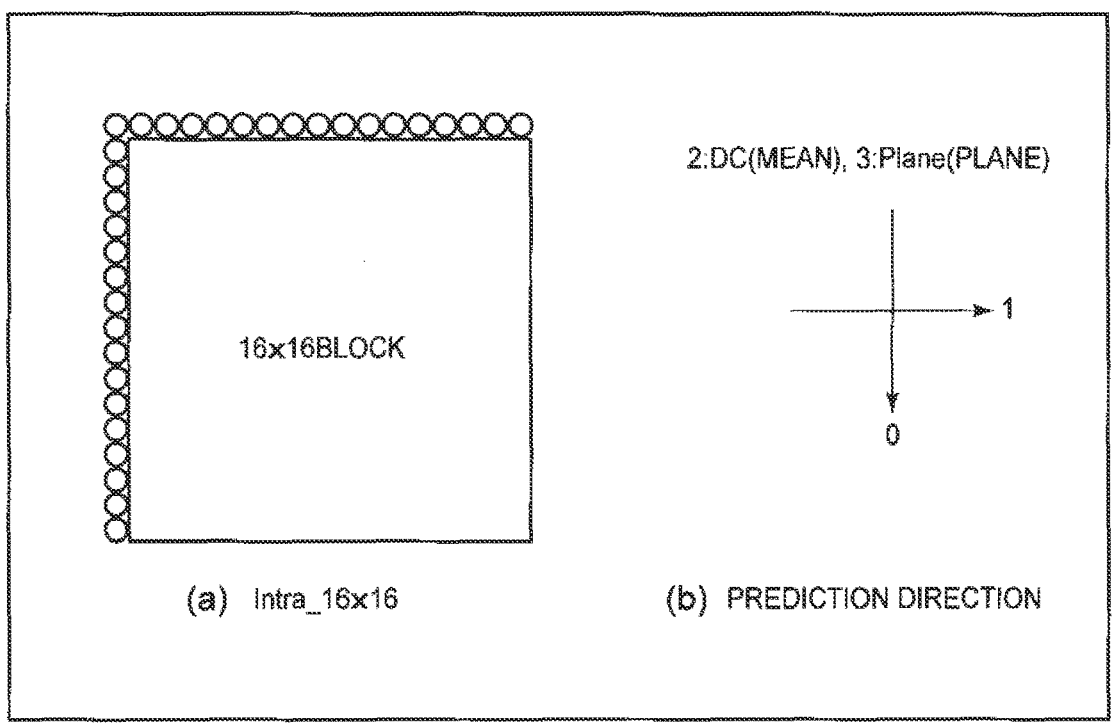
FIG. 17 is an explanatory diagram for describing prediction types.
Figure 18:
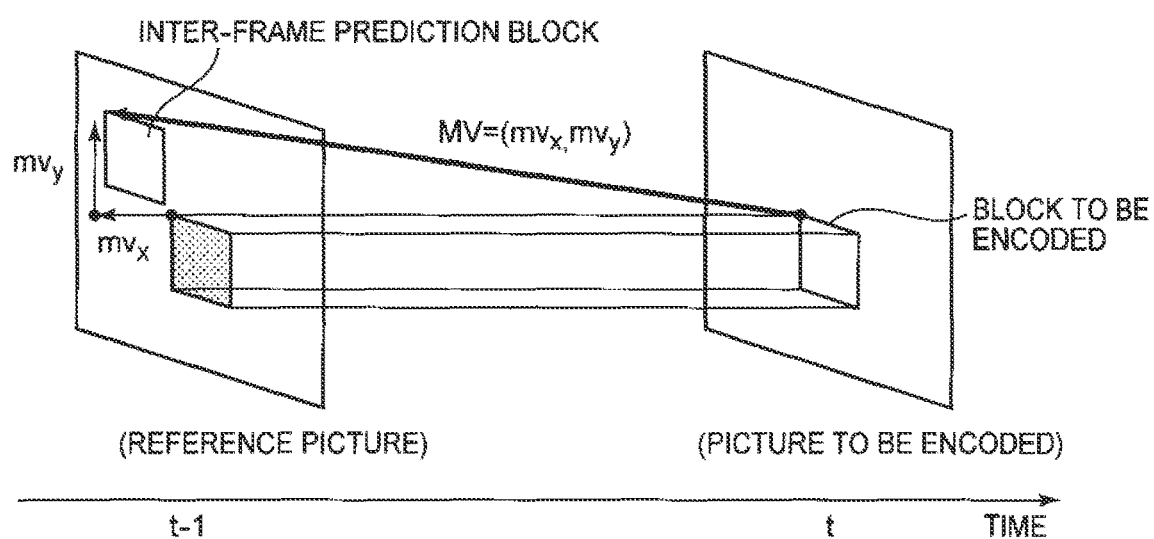
FIG. 18 is an explanatory diagram showing an example of inter-frame prediction using 16×16 block size as an example.

As shown in FIG. 1, the video encoding device in this exemplary embodiment includes a transformer/quantizer 102, an entropy encoder 103, an inverse transformer/inverse quantizer 104, a buffer 105, a predictor 106, a PCM encoder 107, a PCM decoder 108, a multiplex data selector 109, a multiplexer 110, a switch 121, and a switch 122, like the typical video encoding device shown in FIG. 14. The video encoding device in this exemplary embodiment shown in FIG. 1 differs from the video encoding device shown in FIG. 14 in that pcmCodingUnitSize is supplied to the multiplex data selector 109 in order to transmit the PCM header in a CU size more than or equal to pcmCodingUnitSize, and pcmCodingUnitSize is also supplied to the multiplexer 110 in order to signal pcmCodingUnitSize to the video decoding device.

A prediction signal supplied from the predictor 106 is subtracted from input video of a CU size, and the result is input to the transformer/quantizer 102.

The transformer/quantizer 102 frequency-transforms the image (prediction error image) from which the prediction signal has been subtracted.

The transformer/quantizer 102 further quantizes the frequency-transformed prediction error image (frequency transform coefficient), with a quantization step width Qs.

Figure 19:
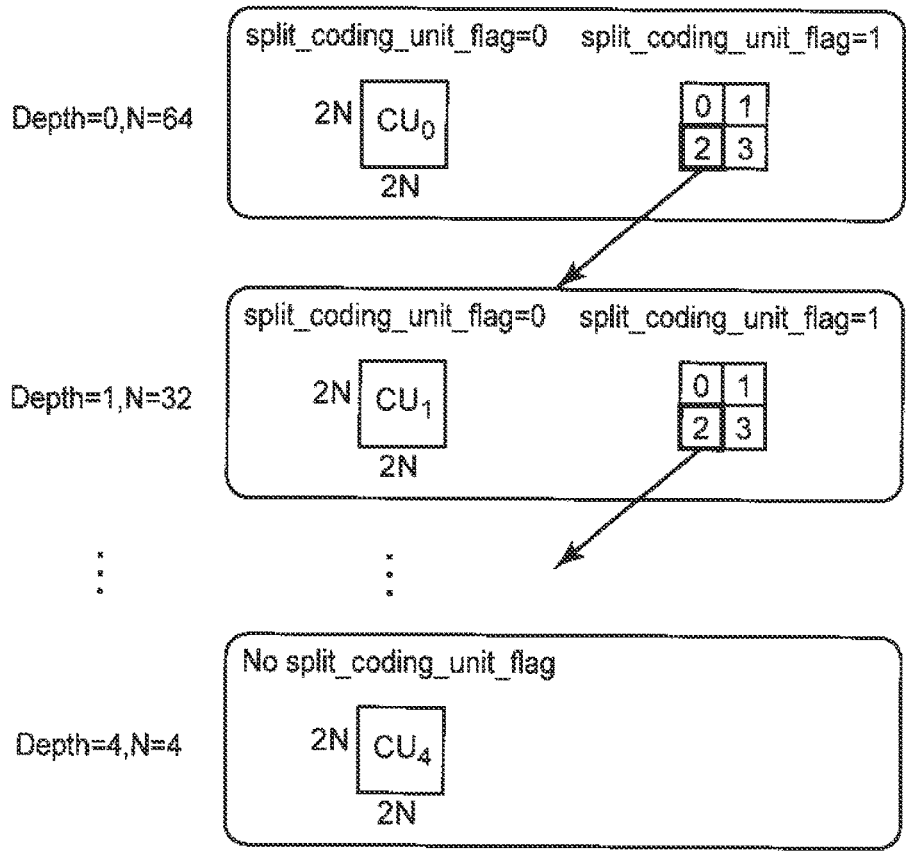
FIG. 19 is an explanatory diagram for describing a CTB.
Figure 20:
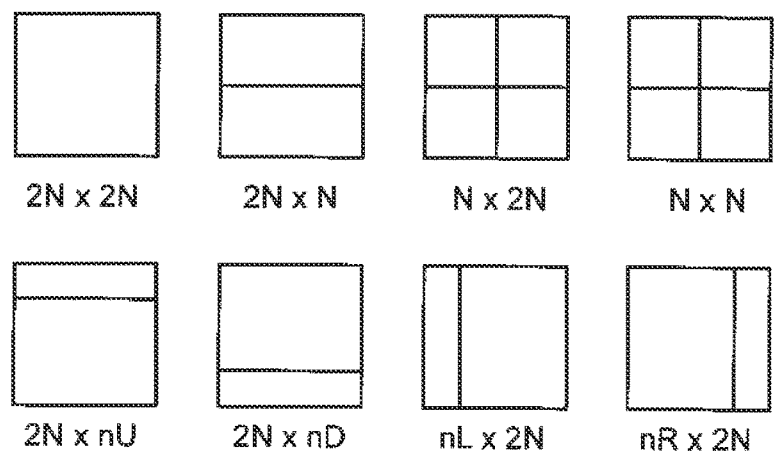
FIG. 20 is an explanatory diagram for describing a PU.

The entropy encoder 103 entropy-encodes split_coding_unit_flag (see FIG. 19) for signaling the CU size, prediction parameters supplied from the predictor 106, and the transform quantization value supplied from the transformer/quantizer 102. The prediction parameters are information related to prediction of the CU to be encoded, such as block type (intra prediction, inter prediction, and PCM), intra prediction block size, intra prediction direction, inter prediction block size, and motion vector.

Based on pcmCodingUnitSize set from the outside via the multiplex data selector 109, the entropy encoder 103 in this exemplary embodiment entropy-encodes pcm_flag syntax, which indicates ON/OFF of PCM encoding, as OFF, in the case where the CU to be encoded has a size greater than or equal to pcmCodingUnitSize and also has a prediction mode of intra prediction.

The inverse transformer/inverse quantizer 104 inverse-quantizes the transform quantization value, with the quantization step width Qs. The inverse transformer/inverse quantizer 104 further inverse-frequency-transforms the frequency transform coefficient obtained by the inverse quantization. The prediction signal is added to the reconstructed prediction error image obtained by the inverse frequency transform, and the result is supplied to the switch 122.

The multiplex data selector 109 monitors the amount of input data of the entropy encoder 103 corresponding to the CU to be encoded that is greater than or equal to pcmCodingUnitSize. In the case where the entropy encoder 103 is capable of entropy-encoding the input data within a processing time of the CU to be encoded that is greater than or equal to pcmCodingUnitSize, the multiplex data selector 109 selects the output data of the entropy encoder 103, and causes the selected data to be supplied to the multiplexer 110 via the switch 121. The multiplex data selector 109 further selects the output data of the inverse transformer/inverse quantizer 104, and causes the selected data to be supplied to the buffer 105 via the switch 122.

In the case where the entropy encoder 103 is not capable of entropy-encoding the input data within the processing time of the CU to be encoded, the multiplex data selector 109 first causes the entropy encoder 103 to entropy-encode and output information indicating that the CU greater than or equal to pcmCodingUnitSize is encoded by PCM encoding. In detail, the multiplex data selector 109 causes the entropy encoder 103 to entropy-encode and output mode_table_idx syntax or pred_mode syntax, which indicates a block type, as intra prediction, and entropy-encode and output the pcm_flag syntax, which indicates ON/OFF of PCM encoding, as ON, in a PU header of the CU.

Next, the output bits of the entropy encoder 103 are byte-aligned. In detail, the entropy encoder 103 supplies a predetermined amount of pcm_alignment_zero_bit syntax to the multiplexer 110. Moreover, an encoding engine of the entropy encoder 103 is initialized for subsequent encoding.

After the encoding engine is initialized, the PCM encoder 107 encodes by PCM encoding the input video of the CU. Output data pcm_sample_luma[i] of luminance of the PCM encoder 107 has a pixel bit length bit_depth_luma of luminance of the input video. Here, i ($0 \leq i \leq 255$) is an index in raster scan order within the block of the CU. Likewise, output data pcm_sample_chroma[i] (i: $0 \leq i \leq 128$) of color difference of the PCM encoder 107 has a pixel bit length bit_depth_chroma of color difference of the input video.

After the input video of the CU is encoded by PCM encoding, the PCM decoder 108 decodes by PCM decoding pcm_sample_luma[i] and pcm_sample_chroma[i].

After the PCM decoding, the multiplex data selector 109 selects the output data of the PCM encoder 107, and causes the selected data to be supplied to the multiplexer 110 via the switch 121.

Lastly, the multiplex data selector 109 selects the output data of the PCM decoder 108, and causes the selected data to be supplied to the buffer 105 via the switch 122.

When complying with Specification of syntax functions, categories, and descriptors in NPL 1 and 4.1.10 Prediction unit syntax in NPL 2, the above-mentioned mode_table_idx syntax, pred_mode syntax, pcm_flag syntax, and pcm_alignment_zero_bit syntax can be signaled as represented in list 1 shown in FIG. 2. In list 1, a variable pcm_unit_flag which is a signaling condition of the pcm_alignment_zero_bit syntax is ON only in the case where the pcm_flag syntax for PCM encoding ON is signaled. Otherwise, the variable pcm_unit_flag is OFF. This exemplary embodiment has a feature that, in list 1, the pcm_flag syntax is signaled only in the PU header of the CU of the size greater than or equal to pcmCodingUnitSize, according to the condition "if (currPredUnitSize>=pcmCodingUnitSize)".

The multiplexer 110 multiplexes the information (max_pcm_coding_unit_hierarchy_depth) related to the PCM coding unit size and the output data of the entropy encoder 103 and the PCM encoder 107, and outputs the multiplexing result. When complying with 4.1.2 Sequence parameter set RBSP syntax in NPL 2, max_pcm_coding_unit_hierarchy_depth syntax (base-2 log (logarithm) of a value obtained by dividing the PCM coding unit size by the minimum coding unit size, "1" in this exemplary embodiment) is multiplexed following log2_min_coding_unit_size_minus3 syntax and max_coding_unit_hierarchy_depth syntax of a sequence parameter set, as represented in list 2 shown in FIG. 3. Here, max_pcm_coding_unit_hierarchy_depth may be called min_pcm_coding_unit_hierarchy_depth. The log2_min_coding_unit_size_minus3 syntax and the max_coding_unit_hierarchy_depth syntax are information for determining a SCU size (MinCodingUnitSize) and a LCU size (MaxCodingUnitSize), respectively. MinCodingUnitSize and MaxCodingUnitSize are respectively computed as follows.

MinCodingUnitSize=1<<
(log2_min_coding_unit_size_minus3+3)

MaxCodingUnitSize=1<<
(log2_min_coding_unit_size_minus3+3+max_coding_unit_hierarchy_depth)

The max_coding_unit_hierarchy_depth syntax and MinCodingUnitSize have the following relation.

max_pcm_coding_unit_hierarchy_depth=log$_2$(pcm-CodingUnitSize/MinCodingUnitSize)

Based on the operation described above, the video encoding device according to the present invention generates the bitstream.

Figure 4:
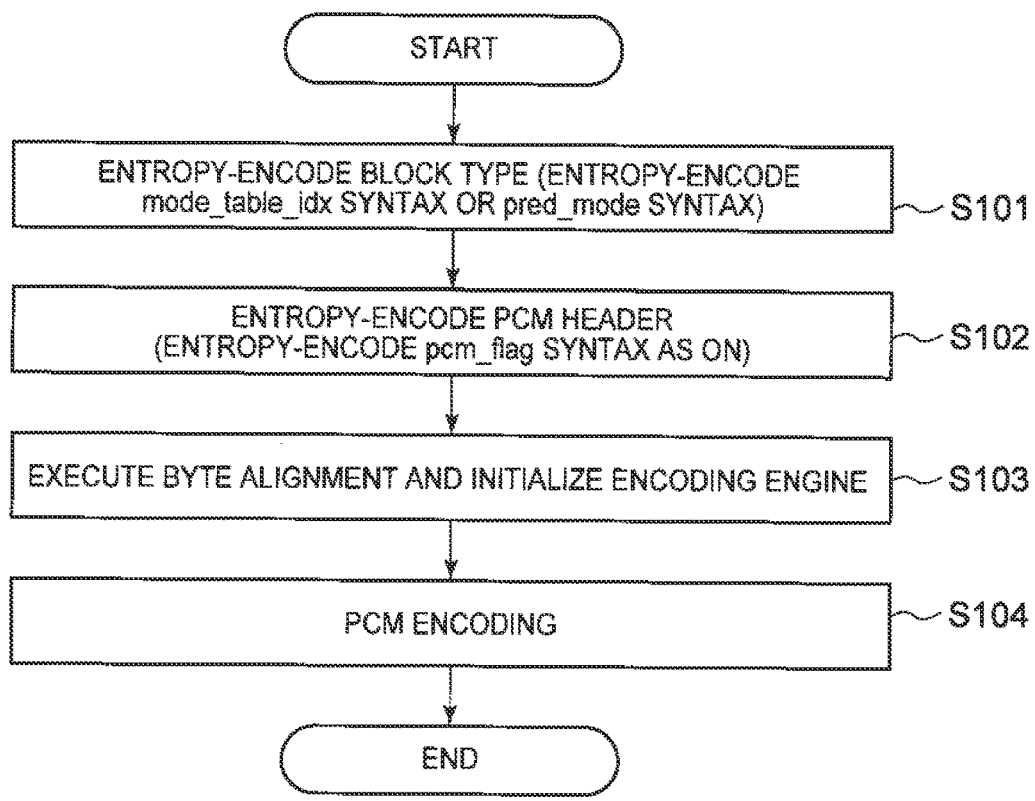
FIG. 4 is a flowchart showing a PCM header writing operation.

The following describes a PCM header writing operation which is a feature of the present invention, with reference to the flowchart in FIG. 4.

As shown in FIG. 4, in the case of not being capable of entropy-encoding within the processing time of the CU to be encoded, the entropy encoder 103 entropy-encodes the block type as intra prediction in step S101. That is, the entropy encoder 103 entropy-encodes the mode_table_idx syntax or the pred_mode syntax as intra prediction. In step S102, the entropy encoder 103 entropy-encodes the PCM header. In detail, the entropy encoder 103 entropy-encodes the pcm_flag syntax as ON. In step S103, the entropy encoder 103 byte-aligns the output bits by supplying the predetermined amount of the pcm_alignment_zero_bit syntax to the multiplexer 110. That is, the entropy encoder 103 outputs the predetermined amount of the pcm_alignment_zero_bit syntax. The entropy encoder 103 also initializes the encoding engine. In step S104, the PCM encoder 107 encodes by PCM encoding the input video of the CU.

The video encoding device in this exemplary embodiment includes: multiplex data selection means for selecting output data of entropy encoding means or PCM encoding means in a coding unit size set from the outside; and multiplexing means for embedding, in a bitstream, a PCM header in the coding unit size set from the outside. Therefore, the ratio of the number of bits of the PCM header in the bitstream can be kept low and the quality of compressed video can be maintained, while guaranteeing a certain processing time for the video encoding device.

Moreover, the multiplexing means embeds, in the bitstream, PCM coding unit size information for signaling the CU size set from the outside to the video decoding device, where the CU size information can be expressed by, for example, a depth difference relative to a depth of a LCU or a SCU. For instance, in the case of expression relative to the depth of the LCU (LCU_depth), a CU size of a predetermined depth can be expressed as $1/2^{(depth-LCU\_depth)}$ of the LCU size ($1/4^{(depth-LCU\_depth)}$ when converted to block size). In the case of expression relative to the depth of the SCU (SCU_depth), a CU size of a predetermined depth can be expressed as $2^{(SCU\_depth-depth)}$ times the SCU size ($4^{(SCU\_depth-depth)}$ times when converted to block size).

By the inclusion of the multiplexing means having the above-mentioned feature, the present invention can enhance the interoperability of the video encoding device and the video decoding device.

The video encoding device in this exemplary embodiment includes means for embedding, in the bitstream, the information related to the coding unit size for which the PCM header is provided, so as to enable the PCM header to be parsed from the bitstream and switching between entropy decoding means and PCM decoding means to be performed equally in video decoding. The interoperability of the video encoding device and the video decoding device can thus be enhanced.

Exemplary Embodiment 2

Exemplary Embodiment 2 shows a video decoding device that decodes the bitstream generated by the video encoding device in Exemplary Embodiment 1.

The video decoding device in this exemplary embodiment includes: means for de-multiplexing PCM coding unit size information multiplexed in the bitstream; block size means for determining a predetermined block size for which a PCM header is parsed, based on the de-multiplexed PCM coding unit size information; parsing means for parsing the PCM header from the bitstream in the coding unit size determined by the block size means; and decoding control means for controlling entropy decoding means and PCM decoding means based on the PCM header parsed by the parsing means.

Figure 5:
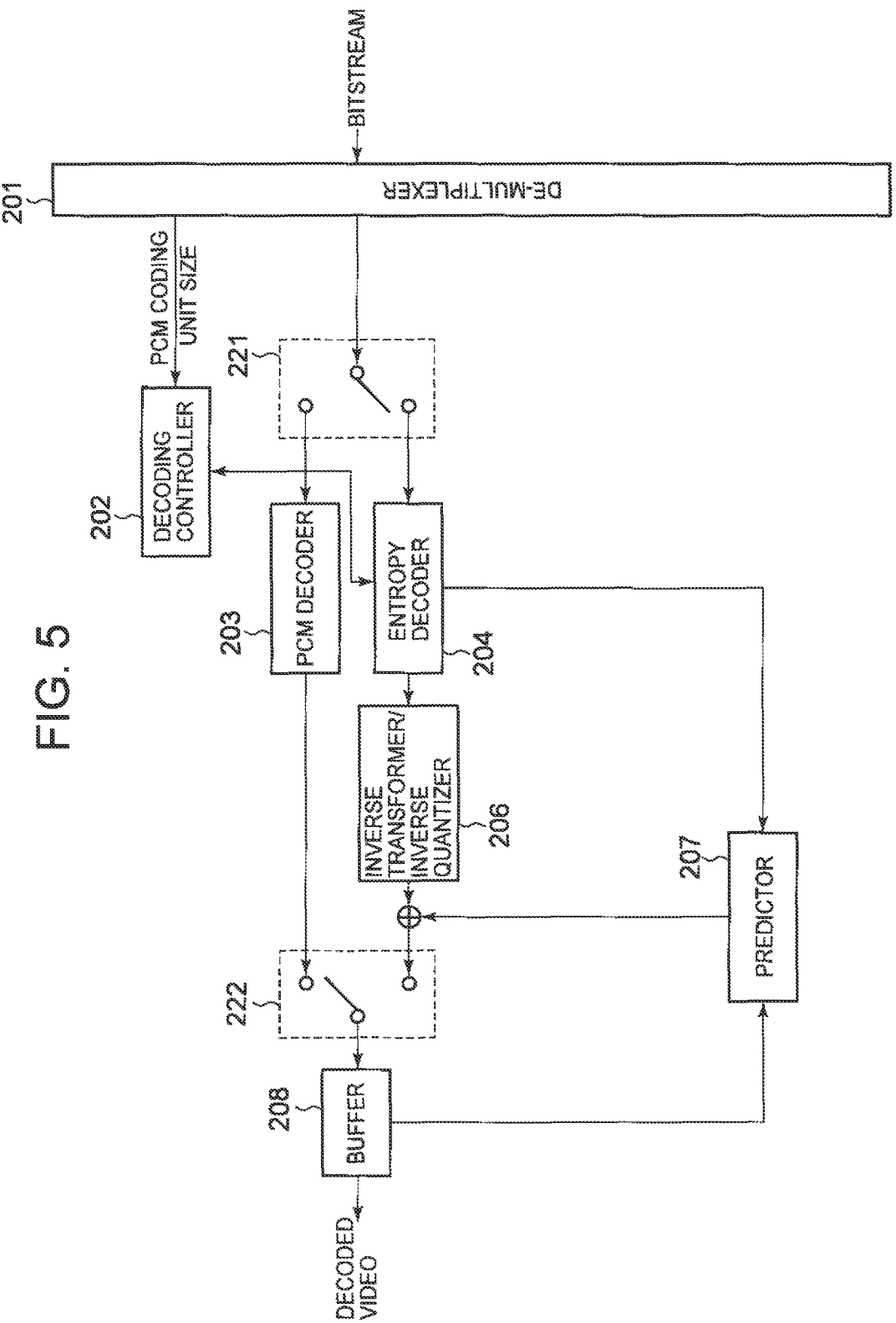
FIG. 5 is a block diagram of a video decoding device in Exemplary Embodiment 2.

As shown in FIG. 5, the video decoding device in this exemplary embodiment includes a de-multiplexer 201, a decoding controller 202, a PCM decoder 203, an entropy decoder 204, an inverse transformer/inverse quantizer 206, a predictor 207, a buffer 208, a switch 221, and a switch 222.

The de-multiplexer 201 de-multiplexes the input bitstream, and extracts the PCM coding unit size information and the entropy-encoded or PCM-encoded video bitstream. The de-multiplexer 201 de-multiplexes the max_pcm_coding_unit_hierarchy_depth syntax following the log2_min_coding_unit_size_minus3 syntax and the max_coding_unit_hierarchy_depth syntax in the sequence parameters, as represented in list 2 shown in FIG. 3. The de-multiplexer 201 then determines, using the de-multiplexed syntax values, the PCM coding unit size pcmCodingUnitSize for which pcm_flag as the PCM header is transmitted, as follows.

pcmCodingUnitSize=1<<
    (log2_min_coding_unit_size_minus3+3+max_
    pcm_coding_unit_hierarchy_depth)

Thus, the de-multiplexer 201 in this exemplary embodiment also has a function of determining the block size of the coding unit for which the PCM header is parsed, based on the de-multiplexed PCM coding unit size information.

The entropy decoder 204 entropy-decodes the video bitstream.

In the case where the coding unit (CU) to be entropy-decoded is not a PCM-encoded CU, the entropy decoder 204 entropy-decodes the prediction parameters and the transform quantization value of the CU, and supplies them to the inverse transformer/inverse quantizer 206 and the predictor 207.

Note that a CU is PCM-encoded in the case where, after split_coding_unit_flag (see FIG. 19) is entropy-decoded and the CU size is determined, the pcm_flag syntax indicating PCM encoding ON in the PU header is entropy-decoded. Thus, the entropy decoder 204 in this exemplary embodiment also has a function of parsing the PCM header including the pcm_flag syntax from the bitstream in the CU of the size greater than or equal to pcmCodingUnitSize.

The inverse transformer/inverse quantizer 206 inverse-quantizes the transform quantization value of luminance and color difference, with a quantization step width. The inverse transformer/inverse quantizer 206 further inverse-frequency-transforms the frequency transform coefficient obtained by the inverse quantization.

After the inverse frequency transform, the predictor 207 generates a prediction signal using an image of a reconstructed picture stored in the buffer 208, based on the entropy-decoded prediction parameters.

After the prediction signal generation, the prediction signal supplied from the predictor 207 is added to the reconstructed prediction error image obtained by the inverse frequency transform by the inverse transformer/inverse quantizer 206, and the result is supplied to the switch 222.

After the addition of the prediction signal, the decoding controller 202 switches the switch 222 to supply the reconstructed prediction error image to which the prediction signal has been added to the buffer 208 as the reconstructed image.

In the case where the CU is PCM-encoded, the decoding controller 202 causes a decoding engine of the entropy decoder 204 to be initialized.

The decoding controller 202 then causes the video bitstream which is in the middle of entropy decoding, to be byte-aligned. The decoding controller 202 causes pcm_alignment_zero_bit to be parsed from the video bitstream until byte-aligned.

Following this, the decoding controller 202 switches the switch 221 to supply the byte-aligned video bitstream to the PCM decoder 203.

The PCM decoder 203 decodes by PCM decoding PCM-encoded luminance data pcm_sample_luma[i] and color difference data pcm_sample_chroma[i] corresponding to the block size of the CU, from the byte-aligned video bitstream.

After the PCM decoding, the decoding controller 202 switches the switch 222 to supply the PCM decoded coding unit image to the buffer 208 as the reconstructed image. The decoding controller 202 switches the switch 221 to the entropy decoder 204, for decoding of a next macroblock.

The reconstructed picture stored in the buffer 208 is then output as a decoded image.

Based on the operation described above, the video decoding device in this exemplary embodiment generates the decoded image.

The following describes a PCM header parsing operation which is a feature of the present invention, with reference to the flowchart in FIG. 6.

As shown in FIG. 6, in the case where the CU is PCM-encoded, the entropy decoder 204 entropy-decodes split_coding_unit_flag and determines the CU size in step S201. In step S202, the entropy decoder 204 entropy-decodes the block type. That is, the entropy decoder 204 entropy-decodes the mode_table_idx syntax or the pred_mode syntax. In steps S203 and S204, the entropy decoder 204 entropy-decodes the pcm_flag syntax only in the case where the block type is intra prediction and the CU size is a size greater than or equal to pcmCodingUnitSize. In the case where the pcm_flag syntax is ON, in step S205 the entropy decoder 204 initializes the decoding engine. The entropy decoder 204 also byte-aligns the video bitstream by parsing the predetermined amount of the pcm_alignment_zero_bit syntax from the de-multiplexer 201. The PCM decoder 203 decodes by PCM decoding the PCM-encoded luminance data pcm_sample_luma[i] and color difference data pcm_sample_chroma[i] corresponding to the CU block size, from the byte-aligned video bitstream. In the case where the CU is not a PCM-encoded CU (step S203) or in the case where the entropy decoder 204 does not entropy-decode the pcm_flag syntax indicating PCM encoding ON in the PU header (step S204), the entropy decoder 204 entropy-decodes the prediction parameters and the transform quantization value of the following CU, and supplies them to the inverse transformer/inverse quantizer 206 and the predictor 207.

The video decoding device in this exemplary embodiment can parse, based on the de-multiplexed PCM coding unit size information, the PCM header from the bitstream in the coding unit of the determined PCM coding unit size, and switch between the entropy decoding means and the PCM decoding means. Therefore, the bitstream in which the ratio of the number of bits of the PCM header is low to thereby maintain video quality can be decoded while guaranteeing a certain processing time for the video decoding device.

Note that the video encoding device may multiplex the PCM coding unit size information (max_pcm_coding_unit_hierarchy_depth) used in Exemplary Embodiment 1, in a picture parameter set or a slice header as represented in list 3 shown in FIG. 7 or list 4 shown in FIG. 8. Similarly, the video decoding device may de-multiplex the max_pcm_coding_unit_hierarchy_depth syntax from the picture parameter set or the slice header.

Moreover, the max_pcm_coding_unit_hierarchy_depth syntax may be base-2 log (logarithm) of a value obtained by dividing the maximum coding unit size (MaxCodingUnitSize) by the PCM coding unit size (pcmCodingUnitSize). That is, the following expression may be used.

max_pcm_coding_unit_hierarchy_depth=log$_2$(MaxCodingUnitSize/pcmCodingUnitSize)

In this case, in the video decoding device, the PCM coding unit size can be computed based on the max_pcm_coding_unit_hierarchy_depth syntax as follows.

pcmCodingUnitSize=1<<
(log2_min_coding_unit_size_minus3+3+max_
coding_unit_hierarchy_depth−max_pcm_
coding_unit_hierarchy_depth)

Note that the video encoding device may concatenate and encode the pcm_flag syntax with the mode_table_idx syntax or the pred_mode syntax. For example, in a CU of a size greater than or equal to the PCM coding unit size, mode_table_idx=0 (codeword 1) may be set as inter prediction, mode_table_idx=1 (codeword 00) as intra prediction with pcm_flag=OFF, and mode_table_idx=2 (codeword 01) as PCM. In a CU of a size less than the PCM coding unit size, mode_table_idx=0 (codeword 0) may be set as inter prediction, and mode_table_idx=1 (codeword 1) as intra prediction with pcm_flag=OFF.

In this case, in the CU of the size greater than or equal to the PCM coding unit size, the video decoding device interprets codeword 1 (mode_table_idx=0) as inter prediction, codeword 00 (mode_table_idx=1) as intra prediction with pcm_flag=OFF, and codeword 01 (mode_table_idx=2) as PCM. In the CU of the size less than the PCM coding unit size, the video decoding device interprets codeword 0 (mode_table_idx=0) as inter prediction, and codeword 1 (mode_table_idx=1) as intra prediction with pcm_flag=OFF.

Exemplary Embodiment 3

In each of the exemplary embodiments described above, PCM is selected in a higher-layer CU in order to guarantee a certain processing time for the video encoding device or the video decoding device. However, in the case of taking into consideration that PCM tends to be selected in an image block having low inter-pixel correlation, i.e. PCM tends to be selected in a lower-layer CU of a divided small region, it is also significant to limit to a predetermined size or less the CU size for which PCM is selected. Based on such consideration, the ratio of the number of bits of the PCM header in the bitstream can also be reduced. The lower-layer CU mentioned here is a CU having a larger depth value, as can be seen from FIG. 19.

In Exemplary Embodiment 3, a video encoding device limits the CU size for which PCM is selected, to the predetermined size or less. The video encoding device has the same structure as shown in FIG. 1.

In the case of limiting the CU size for which PCM is selected to the predetermined size or less, the CU size for which the PCM header is embedded in the bitstream is set to be less than or equal to the PCM coding unit size set from the outside (pcmCodingUnitSize), as an example. It is also assumed that available coding unit sizes are 128, 64, 32, 16, and 8, and pcmCodingUnitSize is 16.

In the video encoding device, the multiplex data selector 109 monitors the amount of input data of the entropy encoder 103 corresponding to the CU to be encoded that is less than or equal to pcmCodingUnitSize. In the case where the entropy encoder 103 is capable of entropy-encoding the input data within a processing time of the CU to be encoded that is less than or equal to pcmCodingUnitSize, the multiplex data selector 109 selects the output data of the entropy encoder 103, and causes the selected data to be supplied to the multiplexer 110 via the switch 121. In the case where the entropy encoder 103 is not capable of entropy-encoding the input data within the processing time of the CU to be encoded, the multiplex data selector 109 first causes the entropy encoder 103 to entropy-encode and output information indicating that the CU whose size is less than or equal to pcmCodingUnitSize is PCM-encoded. In detail, the multiplex data selector 109 causes the entropy encoder 103 to entropy-encode and output the mode_table_idx syntax or the pred_mode syntax, which indicates the block type, as intra prediction, and entropy-encode and output the pcm_flag syntax, which indicates ON/OFF of PCM encoding, as ON, in the PU header of the CU.

In this exemplary embodiment, when complying with Specification of syntax functions, categories, and descriptors in NPL 1 and 4.1.10 Prediction unit syntax in NPL 2, the video encoding device can signal the above-mentioned mode_table_idx syntax, pred_mode syntax, pcm_flag syntax, and pcm_alignment_zero_bit syntax as represented in list 1 shown in FIG. 9. In list 1 shown in FIG. 9, the variable pcm_unit_flag which is a signaling condition of the pcm_alignment_zero_bit syntax is ON only in the case where the pcm_flag syntax for PCM encoding ON is signaled. Otherwise, the variable pcm_unit_flag is OFF. This exemplary embodiment has a feature that, in list 1, the pcm_flag syntax is signaled only in the PU header of the CU whose size is less than or equal to pcmCodingUnitSize, according to the condition "if(currPredUnitSize<=pcmCodingUnitSize)". The other processes of the video encoding device are the same as the processes in Exemplary Embodiment 1. Besides, the contents of list 1 in this exemplary embodiment are the same as the contents of list 1 shown in FIG. 2 in Exemplary Embodiment 1.

Exemplary Embodiment 4

Exemplary Embodiment 4 shows a video decoding device that decodes the bitstream generated by the video encoding device in Exemplary Embodiment 3.

The video decoding device in Exemplary Embodiment 4 has the same structure as shown in FIG. 5. In Exemplary Embodiment 4, however, the video decoding device performs a PCM header parsing operation as shown in the flowchart in FIG. 10. In the case where the CU is PCM-encoded, the entropy decoder 204 entropy-decodes split_coding_unit_flag and determines the CU size in step S201. In step S202, the entropy decoder 204 entropy-decodes the block type. That is, the entropy decoder 204 entropy-decodes the mode_table_idx syntax or the pred_mode syntax. In steps S203B and S204, the entropy decoder 204 entropy-decodes the pcm_flag syntax only in the case where the block type is intra prediction and the CU size is a size less than or equal to pcmCodingUnitSize. In the case where the pcm_flag syntax is ON, in step S205 the entropy decoder 204 initializes the decoding engine. The entropy decoder 204 also byte-aligns the video bitstream by parsing the predetermined amount of the pcm_alignment_zero_bit syntax from the de-multiplexer 201. The PCM decoder 203 decodes by PCM decoding the PCM-encoded luminance data pcm_sample_luma[i] and color difference data pcm_sample_chroma[i] corresponding to the CU block size, from the byte-aligned video bitstream. The other processes of the video decoding device are the same as the processes in Exemplary Embodiment 2.

In the case of limiting to the predetermined size or less the CU size for which PCM is selected, the entropy decoder 204 in the video decoding device also has a function of parsing the PCM header including the pcm_flag syntax from the bitstream in the CU whose size is less than or equal to pcmCodingUnitSize.

In this exemplary embodiment, the bitstream in which the ratio of the number of bits of the PCM header is low to thereby maintain video quality can be decoded while guaranteeing a certain processing time for the video decoding device.

Note that the video encoding device in Exemplary Embodiment 3 may concatenate and encode the pcm_flag syntax with the mode_table_idx syntax or the pred_mode syntax. For example, in a CU of a size less than or equal to the PCM coding unit size, mode_table_idx=0 (codeword 0) may be set as intra prediction with pcm_flag=OFF, mode_table_idx=1 (codeword 10) as inter prediction, and mode_table_idx=2 (codeword 11) as PCM. In a CU of a size greater than the PCM coding unit size, mode_table_idx=0 (codeword 0) may be set as intra prediction with pcm_flag=OFF, and mode_table_idx=1 (codeword 1) as inter prediction.

In this case, in the CU of the size less than or equal to the PCM coding unit size, the video decoding device in Exemplary Embodiment 4 interprets codeword 0 (mode_table_idx=0) as intra prediction with pcm_flag=OFF, codeword 10 (mode_table_idx=1) as inter prediction, and codeword 11 (mode_table_idx=2) as PCM. In the CU of the size greater than the PCM coding unit size, the video decoding device interprets codeword 0 (mode_table_idx=0) as intra prediction with pcm_flag=OFF, and codeword 1 (mode_table_idx=1) as inter prediction.

The pcm_flag syntax may be concatenated and encoded with the pred_mode syntax, in the same manner as in the example of the mode_table_idx syntax.

In the exemplary embodiments described above, in the case of limiting the PCM coding unit size to the maximum coding unit size, the PCM block size information need not be explicitly embedded in the bitstream. This is because the information related to the maximum coding unit size implicitly includes the PCM block size information in such a case.

In the exemplary embodiments described above, in the case of limiting the PCM coding unit size to the minimum coding unit size, the PCM block size information need not be explicitly embedded in the bitstream. This is because the information related to the minimum coding unit size implicitly includes the PCM block size information in such a case.

The pcm_flag syntax may be concatenated and encoded with the pred_mode syntax, in the same manner as in the above-mentioned example of the mode_table_idx syntax. For instance, in an intra slice, syntax and codeword can be associated as follows, as described in NPL 3 (note that this is based on an assumption that no N×N partition (intra prediction and inter prediction) exists in a coding unit other than a minimum coding unit as described in NPL 4).

[Correspondence Between Syntax and Codeword in Minimum Coding Unit Including PCM Encoding]

| Syntax | Codeword |
|---|---|
| Intra 2N×2N | 1 |
| Intra N×N | 01 |
| PCM | 00 |

[Correspondence Between Syntax and Codeword in CU Other than Minimum Coding Unit Including PCM Encoding]

| Syntax | Codeword |
|---|---|
| Intra 2N×2N | 1 |
| PCM | 0 |

[Correspondence Between Syntax and Codeword in Minimum Coding Unit not Including PCM Encoding]

| Syntax | Codeword |
|---|---|
| Intra 2N×2N | 1 |
| Intra N×N | 0 |

[Correspondence Between Syntax and Codeword in Minimum Coding Unit not Including PCM Encoding]

| Syntax | Codeword |
|---|---|
| Intra 2N×2N | none |

Note that "CU including PCM encoding" is a CU of the PCM coding unit size, and "CU not including PCM encoding" is a CU of not the PCM coding unit size. In this case, for example in the minimum coding unit including PCM encoding in the intra slice, the video decoding device interprets codeword 1 as 2N×2N intra prediction, codeword 01 as N×N intra prediction, and codeword 00 as PCM.

Likewise, in a non-intra slice, syntax and codeword can be associated as follows.

[Correspondence Between Syntax and Codeword Common to all CUs]

| Syntax | Codeword |
|---|---|
| Split | 1 |
| Skip | 01 |
| Inter 2N×2N_MRG | 001 |
| Inter 2N×2N | 0001 |
| Others | 0000 |

[Correspondence Between Syntax and Codeword in Minimum Coding Unit Including PCM Encoding, Following Others]

| Syntax | Codeword |
|---|---|
| Inter 2N×N | 0 |
| Inter N×2N | 01 |
| Inter N×N | 001 |
| Intra 2N×2N | 0001 |
| Intra N×N | 00001 |
| PCM | 00000 |

[Correspondence Between Syntax and Codeword in CU Other than Minimum Coding Unit Including PCM Encoding, Following Others]

| Syntax | Codeword |
|---|---|
| Inter 2N×N | 0 |
| Inter N×2N | 01 |
| Intra 2N×2N | 001 |
| PCM | 000 |

[Correspondence Between Syntax and Codeword in Minimum Coding Unit not Including PCM Encoding, Following Others]

| Syntax | Codeword |
|---|---|
| Inter 2N×N | 0 |
| Inter N×2N | 01 |

| Syntax | Codeword |
| --- | --- |
| Inter N×N | 001 |
| Intra 2N×2N | 0001 |
| Intra N×N | 0000 |

[Correspondence Between Syntax and Codeword in CU Other than Minimum Coding Unit not Including PCM Encoding, Following Others]

| Syntax | Codeword |
| --- | --- |
| Inter 2N×N | 0 |
| Inter N×2N | 01 |
| Intra 2N×2N | 00 |

In this case, for example in the minimum coding unit including PCM encoding, the video decoding device interprets codeword 0 following Others as 2N×N inter prediction, codeword 01 as N×2N inter prediction, codeword 001 as N×N inter prediction, codeword 0001 as 2N×2N intra prediction, codeword 00001 as N×N intra prediction, and codeword 00000 as PCM.

Note that the intra slice is a slice composed of only coding units encoded by intra prediction, and the non-intra slice is a slice including coding units encoded by inter prediction.

Each of the exemplary embodiments described above may be realized by hardware, or may be realized by a computer program.

Figure 11:
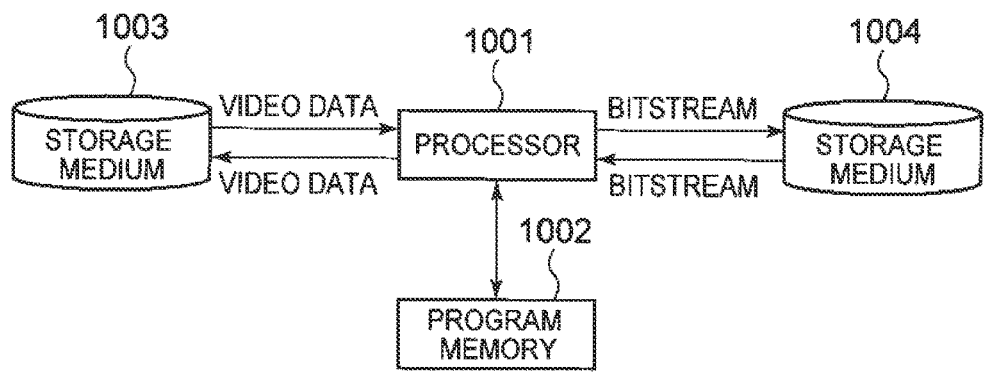
FIG. 11 is a block diagram showing a structural example of an information processing system capable of realizing functions of a video encoding device and a video decoding device according to the present invention.

An information processing system shown in FIG. 11 includes a processor 1001, a program memory 1002, a storage medium 1003 for storing video data, and a storage medium 1004 for storing a bitstream. The storage medium 1003 and the storage medium 1004 may be separate storage media, or may be storage areas included in the same storage medium. As a storage medium, a magnetic storage medium such as a hard disk is applicable.

In the information processing system shown in FIG. 11, a program for realizing the functions of the blocks (except the block of the buffer) shown in each of FIGS. 1 and 5 is stored in the program memory 1002. The processor 1001 realizes the functions of the video encoding device or the video decoding device shown in FIG. 1 or 5, by executing processing according to the program stored in the program memory 1002.

Figure 12:
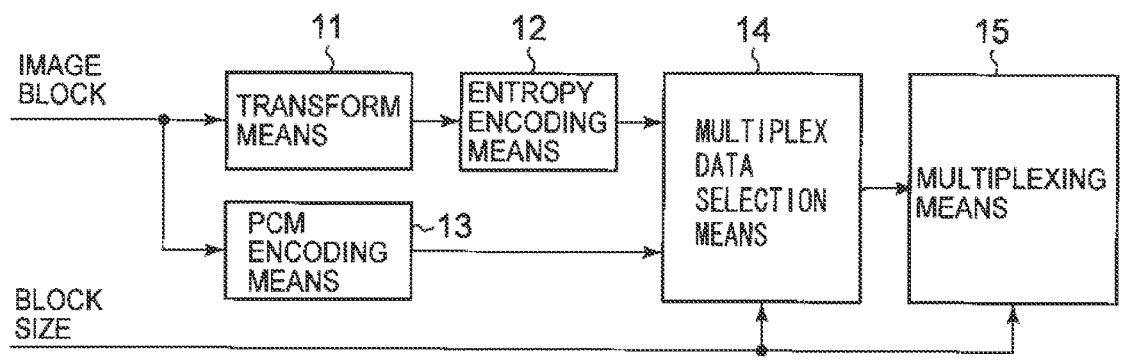
FIG. 12 is a block diagram showing a main part of a video encoding device according to the present invention.

FIG. 12 is a block diagram showing a main part of a video encoding device according to the present invention. As shown in FIG. 12, the video encoding device according to the present invention includes: transform means 11 (e.g. the transformer/quantizer 102 shown in FIG. 1) for transforming an image block; entropy encoding means 12 (e.g. the entropy encoder 103 shown in FIG. 1) for entropy-encoding transformed data of the image block transformed by the transform means 11; PCM encoding means 13 (e.g. the PCM encoder 107 shown in FIG. 1) for encoding by PCM encoding the image block; multiplex data selection means 14 (e.g. the multiplex data selector 109 and the switch 121) for selecting output data of the entropy encoding means 12 (e.g. the entropy encoder 103 shown in FIG. 1) or the PCM encoding means 13, in a block of a block size set from the outside; and multiplexing means 15 (e.g. the multiplexer 110 shown in FIG. 1) for embedding a PCM header in a bitstream, in the block of the block size set from the outside.

Figure 13:
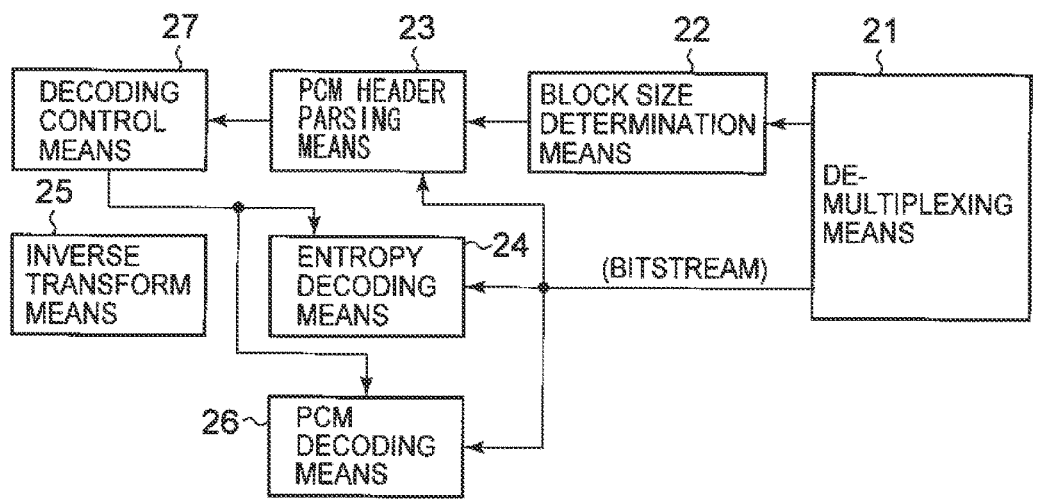
FIG. 13 is a block diagram showing a main part of a video decoding device according to the present invention.

FIG. 13 is a block diagram showing a main part of a video decoding device according to the present invention. As shown in FIG. 13, the video decoding device according to the present invention includes: de-multiplexing means 21 (e.g. the de-multiplexer 201 shown in FIG. 5) for de-multiplexing a bitstream including PCM block size information; PCM block size determination means 22 (e.g. the de-multiplexer 201 shown in FIG. 5) for determining a PCM block size for which a PCM header is parsed, based on the PCM block size information de-multiplexed by the de-multiplexing means 21; PCM header parsing means 23 (e.g. the entropy decoder 204 shown in FIG. 5) for parsing the PCM header from the bitstream, in a block of the PCM block size determined by the PCM block size determination means 22; entropy decoding means 24 (e.g. the entropy decoder 204 shown in FIG. 5) for entropy-decoding transformed data of an image in the bitstream; inverse transform means 25 (e.g. the inverse transformer/inverse quantizer 206 shown in FIG. 5) for inverse-transforming the transformed data entropy-decoded by the entropy decoding means 24; PCM decoding means 26 (e.g. the PCM decoder 203 shown in FIG. 5) for decoding by PCM decoding PCM data of the image in the bitstream; and decoding control means 27 (e.g. the decoding controller 202 shown in FIG. 5) for controlling the entropy decoding means 24 and the PCM decoding means 26, based on the PCM header parsed by the PCM header parsing means 23.

The exemplary embodiments described above may be partly or wholly described in the following supplementary notes, though the present invention is not limited to the following structures.

(Supplementary note 1) A video encoding device wherein the multiplexing means embeds, in the bitstream, information related to N as PCM block size information, in the case where the externally-set block size is greater than or equal to $1/4^N$ of a block size corresponding to a maximum coding unit size or in the case where the externally-set block size is greater than or equal to $4^N$ times a block size corresponding to a minimum coding unit size.

(Supplementary note 2) A video decoding device wherein the de-multiplexing means obtains information related to N as the PCM block size information, in the case where the block size is greater than or equal to $1/4^N$ of a block size corresponding to a maximum coding unit size or in the case where the block size is greater than or equal to $4^N$ times a block size corresponding to a minimum coding unit size.

(Supplementary note 3) A video encoding device wherein the multiplexing means embeds, in the bitstream, information related to N as PCM block size information, in the case where the externally-set block size is less than or equal to $1/4^N$ of a block size corresponding to a maximum coding unit size or in the case where the externally-set block size is less than or equal to $4^N$ times a block size corresponding to a minimum coding unit size.

(Supplementary note 4) A video decoding device wherein the de-multiplexing means obtains information related to N as the PCM block size information, in the case where the block size is less than or equal to $1/4^N$ of a block size corresponding to a maximum coding unit size or in the case where the block size is less than or equal to $4^N$ times a block size corresponding to a minimum coding unit size.

Though the present invention has been described with reference to the above exemplary embodiments and examples, the present invention is not limited to the above exemplary embodiments and examples. Various changes understandable by those skilled in the art within the scope of the present invention can be made to the structures and details of the present invention.

This application claims priority based on Japanese Patent Application No. 2010-264320 filed on Nov. 26, 2010 and Japanese Patent Application No. 2011-026331 filed on Feb. 9, 2011, the disclosures of which are incorporated herein in their entirety.

REFERENCE SIGNS LIST 11 transform means
12 entropy encoding means
13 PCM encoding means
14 multiplex data selection means
15 multiplexing means
21 de-multiplexing means
22 block size determination means
23 PCM header parsing means
24 entropy decoding means
25 inverse transform means
26 PCM decoding means
27 decoding control means
102 transformer/quantizer
103 entropy encoder
104 inverse transformer/inverse quantizer
105 buffer
106 predictor
107 PCM encoder
108 PCM decoder
109 multiplex data selector
110 multiplexer
121 switch
122 switch
201 de-multiplexer
202 decoding controller
203 PCM decoder
204 entropy decoder
206 inverse transformer/inverse quantizer
207 predictor
208 buffer
221 switch
222 switch
1001 processor
1002 program memory
1003 storage medium
1004 storage medium

The invention claimed is:

1. A video decoding device comprising:
one or more processors, the one or more processors configured to:
extract PCM block size information from a bitstream, the PCM block size information indicating a threshold to be used at a subsequent PCM header parsing process;
compute the threshold based on the PCM block size information;
execute the parsing process of parsing a PCM header from the bitstream with respect to an encoded block, only when a block size of the encoded block is equal to or greater than the computed threshold;
parse transformed data of an image in the bitstream based on the PCM header; and
decode by PCM decoding PCM data of the image in the bitstream based on the PCM header.

2. A video decoding method comprising:
extracting PCM block size information from a bitstream, the PCM block size information indicating a threshold to be used at a subsequent PCM header parsing step;
computing the threshold based on the PCM block size information;
parsing a PCM header from the bitstream with respect to an encoded block, only when a block size of the encoded block is equal to or greater than the computed threshold;
controlling an entropy decoding process and a PCM decoding process based on the PCM header;
parsing transformed data of an image in the bitstream upon the entropy decoding process being controlled; and
decoding by PCM-decoding PCM data of the image in the bitstream upon the PCM decoding process being controlled.

3. A non-transitory computer readable information recording medium storing video decoding program which, when executed by a processor, performs a method comprising:
extracting PCM block size information from a bitstream, the PCM block size information indicating a threshold to be used at a subsequent PCM header parsing step;
computing the threshold based on the PCM block size information;
parsing a PCM header from the bitstream with respect to an encoded block, only when a block size of the encoded block is equal to or greater than the computed threshold;
controlling an entropy decoding process and a PCM decoding process based on the PCM header;
parsing transformed data of an image in the bitstream upon the entropy decoding process being controlled; and
decoding by PCM-decoding PCM data of the image in the bitstream upon the PCM decoding process being controlled.

* * * * *